United States Patent
He et al.

(10) Patent No.: US 9,418,101 B2
(45) Date of Patent: Aug. 16, 2016

(54) QUERY OPTIMIZATION

(75) Inventors: Xiaowen He, Ottawa (CA); Lin Luo, Carp (CA); Martin Petitclerc, Quebec (CA)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 13/612,611

(22) Filed: Sep. 12, 2012

(65) Prior Publication Data

US 2014/0074771 A1    Mar. 13, 2014

(51) Int. Cl.
   G06F 17/00    (2006.01)
   G06F 17/30    (2006.01)

(52) U.S. Cl.
   CPC .... G06F 17/30389 (2013.01); G06F 17/30592 (2013.01)

(58) Field of Classification Search
   CPC ............ G06F 17/30592; G06F 17/246; G06F 11/3409; G06Q 30/02
   See application file for complete search history.

(56) References Cited

U.S. PATENT DOCUMENTS

| | | | |
|---|---|---|---|
| 6,898,603 B1* | 5/2005 | Petculescu | G06F 17/30902 707/600 |
| 7,657,516 B2 | 2/2010 | Zaman et al. | |
| 7,716,233 B2 | 5/2010 | Xiong | |
| 7,779,031 B2 | 8/2010 | Grosset et al. | |
| 8,095,499 B2 | 1/2012 | Thanu | |
| 8,122,050 B2 | 2/2012 | Mordvinov et al. | |
| 8,204,901 B2 | 6/2012 | Pimpale et al. | |
| 2004/0006574 A1* | 1/2004 | Witkowski et al. | 707/104.1 |
| 2004/0215626 A1* | 10/2004 | Colossi et al. | 707/100 |
| 2006/0010294 A1* | 1/2006 | Pasumansky et al. | 711/123 |
| 2007/0027904 A1* | 2/2007 | Chow | G06F 17/30592 |
| 2007/0061291 A1 | 3/2007 | Azizi | |
| 2010/0100558 A1* | 4/2010 | Bakalash et al. | 707/756 |
| 2010/0121868 A1 | 5/2010 | Biannic et al. | |
| 2013/0166566 A1* | 6/2013 | Lemke et al. | 707/741 |

OTHER PUBLICATIONS

Andrade, H., T. Kurc, A. Sussman, E. Borovikov, and J. Saltz, "Servicing Mixed Data Intensive Query Workloads", 2002, Total 12 pp.

Bellatreche, L., A. Giacometti, D. Laurent, P. Marcel, and H. Mouloudi, "OLAP Query Optimization: A Framework for Combining Rule-Based and Cost-Based Approaches", EDA'2005, Total 22 pp.

Zhu, Q., B. Dunkel, W. Lau, S. Chen, and B. Schiefer, "Piggyback Statistics Collection for Query Optimization: Towards a Self-Maintaining Database Management System", The Computer Journal, vol. 47, No. 2, 2004, The British Computer Society, received Jan. 8, 2002; revised Aug. 28, 2003, Total 24 pp.

(Continued)

*Primary Examiner* — Mariela Reyes
*Assistant Examiner* — Courtney Harmon
(74) *Attorney, Agent, or Firm* — Janaki K. Davda; Konrad, Raynes, Davda & Victor LLP

(57) ABSTRACT

Provided are techniques for generating a relational query. Information is collected from a query specification and a model for an On-Line Analytical Processing (OLAP) query having at least a first expression and a second expression. The collected information is used to generate a relational query to retrieve report data to be used to satisfy the first expression and the second expression.

18 Claims, 42 Drawing Sheets

(56) References Cited

OTHER PUBLICATIONS

Jin, Chun, "Optimizing Multiple Continuous Queries", [online], © 2006, CMU-LTI-06-009, Language Technologies Institute, School of Computer Science, (<URL:http://www.lti.cs.cmu.edu/research/thesis/2006/chun_jin.pdf>), Total 232 pp.

Kalnis, P. and D. Papadias, "Multi-query Optimization for On-line Analytical Processing", [online], Information Systems 28 (2003) 457-473, © 2003 Elsevier Science Ltd., Department of Computer Science, Hong Kong University of Science and Technology, Clear Water Bay, Hong Kong, [Received Nov. 23, 2001; accepted Apr. 18, 2002], (<URL: http://www.cs.ust.hk/~dimitris/PAPERS/IS03-MQO.pdf>), Total 17 pp.

Kalnis, P. and D. Papadias, "Optimization Algorithms for Simultaneous Multidimensional Queries in OLAP Environments", Proceedings of the Third International Conference on Data Warehousing and Knowledge Discovery, Department of Computer Science, Hong Kong University of Science and Technology, Clear Water Baym Hong Kong, 2001, Total 10 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Munagala, K., U. Srivastava, and J. Widom, "Optimization of Continuous Queries with Shared Expensive Filters", [online], PODS'07, Jun. 11-13, 2007, Beijing, China, © 2007 ACM, (<URL:http://infolab.stanford.edu/~usriv/papers/shared.pdf>), Total 10 pp.

Pu, K.Q., "On Formal Methods of Multidimensional Databases", [online], © 2006, Graduate Department of Computer Science University of Toronto, (<URL:http://leda.science.uoit.ca/kenpu/pdf/pu_thesis.pdf>), Total 173 pp.

\* cited by examiner

600

| ▫▫ | | <#Unit Sales#> |
|---|---|---|
| <#Store Name#> | <Store Manager> | <#1234#> |
| | <Store Manager> | <#1234#> |
| <#Store Name#> | <Store Manager> | <#1234#> |
| | <Store Manager> | <#1234#> |

FIG. 6

```
SELECT
{[Measures].[Sales_Measures_Unit Sales]}
         DIMENSION PROPERTIES PARENT_UNIQUE_NAME, PARENT_LEVEL ON
AXIS(0),
[Sales_Store].[Store].[Store Name].MEMBERS
         DIMENSION PROPERTIES PARENT_UNIQUE_NAME,
         [Sales_Store].[Store].[Store Name].[Store Manager], PARENT_LEVEL ON
AXIS(1)
FROM [Foodmart DMR]
```

FIG. 7

```
SELECT DISTINCT "store"."store_country" AS "column0",
    "store"."store_state" AS "column1",
    "store"."store_city" AS "column2",
    "store"."store_id" AS "column3",
    "store"."store_name" AS "column4"
FROM "FoodMart 2000"."dbo"."store" "store"
ORDER BY "column0" ASC,
    "column1" ASC,
    "column2" ASC,
    "column4" ASC,
    "column3" ASC
```

```
SELECT DISTINCT "store"."store_id" AS "column0",
  "store"."store_name" AS "column1",
  "store"."store_manager" AS "column2"
FROM "FoodMart 2000"."dbo"."store" "store"
```

FIG. 9

```
SELECT DISTINCT "store"."store_country" AS "column0",
    "store"."store_state" AS "column1",
    "store"."store_city" AS "column2",
    "store"."store_id" AS "column3",
    "store"."store_name" AS "column4",
    "store"."store_manager" AS "column5"
FROM "FoodMart 2000"."dbo"."store" "store"
ORDER BY "column0" ASC,
    "column1" ASC,
    "column2" ASC,
    "column4" ASC,
    "column3" ASC
```

|  |  | Unit Sales |
|---|---|---|
| Store 6 | Maris | 21,333 |
| Store 7 | White | 25,663 |
| Store 24 | Byrd | 25,635 |
| Store 14 | Strehlo | 2,117 |
| Store 11 | Erickson | 26,079 |
| Store 13 | Inmon | 41,580 |
| Store 2 | Smith | 2,237 |
| Store 3 | Davis | 24,576 |
| Store 15 | Ollom | 25,011 |
| Store 16 | Mantle | 23,591 |
| Store 17 | Mays | 35,257 |
| Store 22 | Byrg | 2,203 |
| Store 23 | Johnson | 11,491 |

FIG. 11

```
SELECT
{[Measures].[Sales_Measures_Unit Sales]}
        DIMENSION PROPERTIES PARENT_UNIQUE_NAME, PARENT_LEVEL ON
AXIS(0),
FILTER([Sales_Store].[Store].[Store Name].MEMBERS,
[Measures].[Sales_Measures_Unit Sales] > 25000)
        DIMENSION PROPERTIES PARENT_UNIQUE_NAME,
        [Sales_Store].[Store].[Store Name].[Store Manager], PARENT_LEVEL ON
AXIS(1)
FROM [Foodmart DMR]
```

FIG. 12

```
SELECT
    NON EMPTY {[Measures].[Sales_Filtered Measures_Unit Sales]}
        DIMENSION PROPERTIES PARENT_UNIQUE_NAME, PARENT_LEVEL
    ON AXIS(0),
    NON EMPTY
        {[Sales_Product].[Product].[Product Family].MEMBERS,
         [Sales_Product].[Product].[Product Department].MEMBERS}
        DIMENSION PROPERTIES PARENT_UNIQUE_NAME, PARENT_LEVEL
    ON AXIS(1)
FROM [Foodmart DMR]
CELL PROPERTIES VALUE, CELL_ORDINAL, FORMAT_STRING
```

FIG. 14

```
SELECT
  "product_class0"."product_family" AS "column0",
  "product_class0"."product_department" AS "column1"
FROM
  "product_class0"
GROUP BY
  "product_class0"."product_family",
  "product_class0"."product_department"
ORDER BY
  "column0" ASC,
  "column1" ASC
```

```
SELECT NON EMPTY {[Measures].[Sales_Filtered Measures_Unit Sales]}
            DIMENSION PROPERTIES PARENT_UNIQUE_NAME, PARENT_LEVEL
ON AXIS(0),
       NON EMPTY
           {[Sales_Product].[Product].[Product Family].MEMBERS,
            [Sales_Product].[Product].[Product Department].MEMBERS}
            DIMENSION PROPERTIES PARENT_UNIQUE_NAME, PARENT_LEVEL
ON AXIS(1)
FROM [Foodmart DMR]
       CELL PROPERTIES VALUE, CELL_ORDINAL, FORMAT_STRING
```

```
WITH
"product0" AS
  (
  SELECT
     "product"."product_class_id",
     "product"."product_id",
     "product"."brand_name",
     "product"."product_name",
     "product"."SKU",
     "product"."SRP",
     "product"."gross_weight",
     "product"."net_weight",
     "product"."recyclable_package",
     "product"."low_fat",
     "product"."units_per_case",
     "product"."cases_per_pallet",
     "product"."shelf_width",
     "product"."shelf_height",
     "product"."shelf_depth"
  FROM
     "FoodMart 2000"."dbo"."product"
  WHERE
     NOT ( "product"."product_id" IS NULL )
  ),
```

```
"product_class1" AS
  (
  SELECT
    "product_class"."product_class_id",
    "product_class"."product_subcategory",
    "product_class"."product_category",
    "product_class"."product_department",
    "product_class"."product_family"
  FROM
    "FoodMart 2000"."dbo"."product_class"
  WHERE
    NOT ( "product_class"."product_class_id" IN (
      7,
      59 ) ) AND
    NOT ( "product_class"."product_subcategory" IN (
      'Non-Alcoholic Wine' ) ) AND
    NOT ( "product_class"."product_subcategory" IN (
      'Dish Soap',
      'Dishwasher Soap',
      'Shower Soap' ) )
  ),
"SQ0_FetchCellValues1" AS
  (
  SELECT
    "product_class1"."product_family" AS "column0",
    "product_class1"."product_department" AS "column1",
    SUM("sales_fact_1997"."unit_sales") AS "column2"
  FROM
    "FoodMart 2000"."dbo"."customer" "customer"
      INNER JOIN "FoodMart 2000"."dbo"."sales_fact_1997" "sales_fact_1997"
        ON "customer"."customer_id" = "sales_fact_1997"."customer_id"
          INNER JOIN "product0"
        ON "product0"."product_id" = "sales_fact_1997"."product_id"
            INNER JOIN "product_class1"
          ON "product0"."product_class_id" = "product_class1"."product_class_id"
```

```
  WHERE
     "customer"."gender" = 'M'
  GROUP BY
     "product_class1"."product_family",
     "product_class1"."product_department"
  )
SELECT
   "SQ0_FetchCellValues1"."column0" AS "column0",
   "SQ0_FetchCellValues1"."column1" AS "column1",
   "SQ0_FetchCellValues1"."column2" AS "column2",
   SUM("SQ0_FetchCellValues1"."column2")
     OVER(
        PARTITION BY
           "SQ0_FetchCellValues1"."column0"
     ) AS "column3"
FROM
   "SQ0_FetchCellValues1"
```

FIG. 20C

|  | Unit Sales |
|---|---|
| Drink | 12,395 |
| Food | 97,126 |
| Non-Consumable | 25,694 |
| Alcoholic Beverages | 3,399 |
| Beverages | 6,797 |
| Dairy | 2,199 |
| Baked Goods | 4,099 |
| Baking Goods | 10,404 |
| Breakfast Foods | 1,496 |
| Canned Foods | 9,619 |
| Canned Products | 945 |
| Dairy | 6,372 |
| Deli | 6,047 |
| Eggs | 2,131 |
| Frozen Foods | 13,644 |
| Meat | 873 |
| Produce | 19,079 |
| Seafood | 817 |
| Snack Foods | 15,609 |
| Snacks | 3,425 |

← Product Family (top group)

← Product Department (bottom group)

```
SELECT
  NON EMPTY {[Measures].[Sales_Measures_Store sqft]} DIMENSION PROPERTIES PARENT_UNIQUE_NAME, PARENT_LEVEL ON AXIS(0),
  NON EMPTY DESCENDANTS([Sales_Store].[All Stores].[USA], [Sales_Store].[Store].[Store State]) DIMENSION PROPERTIES PARENT_UNIQUE_NAME, PARENT_LEVEL ON AXIS(1)
FROM [Foodmart DMR] CELL PROPERTIES VALUE, CELL_ORDINAL, FORMAT_STRING
```

```
2400
┌─────────────────────────────────────────┐
│ SELECT                                  │
│    "store"."store_country" AS "column0",│
│    "store"."store_state" AS "column1"   │
│ FROM                                    │
│    "FoodMart 2000"."dbo"."store" "store"│
│ WHERE                                   │
│    "store"."store_country" = 'USA'      │
│ GROUP BY                                │
│    "store"."store_country",             │
│    "store"."store_state"                │
│ ORDER BY                                │
│    "column0" ASC,                       │
│    "column1" ASC                        │
└─────────────────────────────────────────┘
```

FIG. 24

|  | <#Unit Sales#> | Store Cost - $10,000 |
|---|---|---|
| <#Product Family#> | <#1234#> | <#1234#> |
| <#Product Family#> | <#1234#> | <#1234#> |

FIG. 26

```
WITH
  MEMBER
    [Measures].[XQE_V5M_CM0]
      AS "(([Measures].[Sales_Measures_Store Cost])-10000)",
      SOLVE_ORDER = 4
SELECT
  NON EMPTY
    {[Measures].[Sales_Measures_Unit Sales],
     [Measures].[XQE_V5M_CM0]}
    DIMENSION PROPERTIES PARENT_UNIQUE_NAME,
      PARENT_LEVEL
    ON AXIS(0),
  NON EMPTY
    [Sales_Product].[Product].[Product Family].MEMBERS
    DIMENSION PROPERTIES PARENT_UNIQUE_NAME,
      PARENT_LEVEL
    ON AXIS(1)
FROM
  [Foodmart DMR]
  CELL PROPERTIES VALUE,
    CELL_ORDINAL,
    FORMAT_STRING
```

```
SELECT
   "product_class1"."product_family" AS "column0",
   SUM("sales_fact_1997"."unit_sales") AS "column1",
   SUM("sales_fact_1997"."store_cost") AS "column2"
FROM
   (
   SELECT
      "product"."product_class_id",
      "product"."product_id",
      "product"."brand_name",
      "product"."product_name",
      "product"."SKU",
      "product"."SRP",
      "product"."gross_weight",
      "product"."net_weight",
      "product"."recyclable_package",
      "product"."low_fat",
      "product"."units_per_case",
      "product"."cases_per_pallet",
      "product"."shelf_width",
      "product"."shelf_height",
      "product"."shelf_depth"
   FROM
      "FoodMart 2000"."dbo"."product"
   WHERE
      NOT ( "product"."product_id" IS NULL )
   ) "product0"
```

```
INNER JOIN
(
SELECT
    "product_class"."product_class_id",
    "product_class"."product_subcategory",
    "product_class"."product_category",
    "product_class"."product_department",
    "product_class"."product_family"
FROM
    "FoodMart 2000"."dbo"."product_class"
WHERE
    NOT ( "product_class"."product_class_id" IN (
        7,
        59 ) ) AND
    NOT ( "product_class"."product_subcategory" IN (
        'Non-Alcoholic Wine' ) ) AND
    NOT ( "product_class"."product_subcategory" IN (
        'Dish Soap',
        'Dishwasher Soap',
        'Shower Soap' ) )
) "product_class1"
    ON "product0"."product_class_id" = "product_class1"."product_class_id"
        INNER JOIN "FoodMart 2000"."dbo"."sales_fact_1997" "sales_fact_1997"
        ON "product0"."product_id" = "sales_fact_1997"."product_id"
GROUP BY
    "product_class1"."product_family"
```

FIG. 28B

|  | Unit Sales | *Store Cost - $10,000* |
|---|---|---|
| Drink | 24,597 | *$9,477.23* |
| Food | 191,940 | *$153,270.72* |
| Non-Consumable | 50,236 | *$32,879.28* |

FIG. 29

```
WITH
  MEMBER [Sales_Product].[XQE_V5M_CM2] AS 'MAX([Sales_Product].[Product].[Product
Department].MEMBERS)', SOLVE_ORDER = 4
  MEMBER [Sales_Product].[XQE_V5M_CM1] AS 'MIN([Sales_Product].[Product].[Product
Department].MEMBERS)', SOLVE_ORDER = 4
  MEMBER [Sales_Product].[XQE_V5M_CM0] AS 'AVG([Sales_Product].[Product].[Product
Department].MEMBERS)', SOLVE_ORDER = 4
SELECT
  {[Measures].[Sales_Measures_Unit Sales]} DIMENSION PROPERTIES
PARENT_UNIQUE_NAME, PARENT_LEVEL ON AXIS(0),
  {[Sales_Product].[Product].[Product Department].MEMBERS AS [XQE_SA0] ,
HEAD({[Sales_Product].[XQE_V5M_CM2]}, COUNT(HEAD({XQE_SA0]}, IncludeEmpty)),
HEAD({[Sales_Product].[XQE_V5M_CM1]}, COUNT(HEAD({XQE_SA0]}, IncludeEmpty)),
HEAD({[Sales_Product].[XQE_V5M_CM0]}, COUNT(HEAD({XQE_SA0]}, IncludeEmpty))}
DIMENSION PROPERTIES PARENT_UNIQUE_NAME, PARENT_LEVEL ON AXIS(1)
FROM [Foodmart DMR]  CELL PROPERTIES VALUE, CELL_ORDINAL,
FORMAT_STRING
```

| Filter: Product Family in ('Drink', 'Food') | | ← 3200 |
|---|---|---|
| | Unit Sales | |
| Alcoholic Beverages | 6,838 | |
| Beverages | 13,573 | |
| Dairy | 4,186 | |
| Baked Goods | 7,870 | |
| Baking Goods | 20,245 | |
| Breakfast Foods | 3,317 | |
| Canned Foods | 19,026 | |
| Canned Products | 1,812 | |
| Dairy | 12,885 | |
| Deli | 12,037 | |
| Eggs | 4,132 | |
| Frozen Foods | 26,655 | |
| Meat | 1,714 | |
| Produce | 37,792 | |
| Seafood | 1,764 | |
| Snack Foods | 30,545 | |
| Snacks | 6,884 | |
| Starchy Foods | 5,262 | |
| Maximum | 37,792 | |
| Minimum | 1,714 | |
| Average | $12,030 | |

FIG. 32

QUERY OPTIMIZATION

FIELD

Embodiments of the invention relate to query optimization. In particular, embodiments of the invention relate to relational On-Line Analytical Processing (OLAP) query optimization over Business Intelligence (BI) reports.

BACKGROUND

An OLAP database may be described as a set of data that is understood in terms of attributes or dimensions. For example, a 3-dimensional OLAP database may store data for the following three dimensions: Product, Market, and Time. The OLAP database may be populated with data that is stored in a relational database. An intersection of a set of dimensions may be described as a cell having a cell value (i.e., a measure). Also, dimensions may be organized as a hierarchy. Dimensions may also have members that are used as keys to access cell values. For example, members may be specific products, customers, time periods, geographic regions, etc.

A type of OLAP database is a Relational OLAP (ROLAP) database. A Relational OLAP database may be described as an OLAP model built on top of a relational database. A Relational OLAP model includes an OLAP model definition and describes how the OLAP model objects map to relational model objects (e.g., tables and columns).

Multidimensional Expressions (MDX) may be described as a query language for inserting, updating, and retrieving data from an OLAP database. The OLAP database translates the MDX query into one or more SQL queries against the relational database to retrieve the member and cell values to return as part of executing an MDX query.

An MDX query includes one or more expressions. Before executing (i.e., evaluating) the query, it is difficult to determine what is required from the relational database because the execution of some expressions are dependent on the results of executing some other expressions. Trying to preload data from the relational database into the OLAP database before execution of any MDX expression may lead to loading the entire relational database in memory or to executing the query itself or part of it.

On the other hand, accessing the relational database on-demand while executing the MDX query ensures loading members and cell values that are required for that MDX query, but this may result in granular SQL queries.

That is, when an MDX query is executed against the OLAP database, if data needed by the MDX query is not in the OLAP database, then one or more Structured Query Language (SQL) queries are generated. SQL may be described as a query language for inserting, updating, and retrieving data from a relational database. The one or more SQL queries are executed against the relational database to retrieve data from the relational database that is inserted into the OLAP database.

Thus, MDX query execution may result in many SQL queries being generated for relational database access. Some OLAP databases cache data to prevent querying for the same data more than once between query executions or within the same query execution. That is, the OLAP database uses a local cache to minimize query cost against the relational database. That is, members and cell values within a OLAP database are cached.

SUMMARY

Provided are a method, computer program product, and system for generating a relational query. Information is collected from a query specification and a model for an On-Line Analytical Processing (OLAP) query having at least a first expression and a second expression. The collected information is used to generate a relational query to retrieve report data to be used to satisfy the first expression and the second expression.

BRIEF DESCRIPTION OF THE SEVERAL VIEWS OF THE DRAWINGS

Referring now to the drawings in which like reference numbers represent corresponding parts throughout:

FIG. 2 is formed by FIG. 2A and 2B.

FIG. 4 is formed by FIG. 4A and 4B.

FIG. 6 illustrates an example BI report specification (for a first example) in accordance with certain embodiments.

FIG. 7 illustrates an example OLAP query (for a first example) in accordance with certain embodiments.

FIG. 8 illustrates an example relational query to load store name members (for a first example) in accordance with certain embodiments.

FIG. 9 illustrates an example relational query to load the member property (for a first example) in accordance with certain embodiments.

FIG. 10 illustrates an example relational query to load both members and property values (for a first example) in accordance with certain embodiments.

FIG. 11 illustrates a rendered report (for a first example) in accordance with certain embodiments.

FIG. 12 illustrates an example of another OLAP query (for a first example) in accordance with certain embodiments.

FIG. 14 illustrates an example OLAP query (for a second example) in accordance with certain embodiments.

FIG. 15 illustrates an example relational query to load both levels (for a second example) in accordance with certain embodiments.

FIG. 18 illustrates an example OLAP query (for a third example) in accordance with certain embodiments.

FIG. 20 illustrates an example relational query to load two levels of aggregation (for a third example) in accordance with certain embodiments. FIG. 20 is formed by FIG. 20A, FIG. 20B, and FIG. 20C.

FIG. 21 illustrates a rendered report (for a third example) in accordance with certain embodiments.

FIG. 23 illustrates an example OLAP query (for a fourth example) in accordance with certain embodiments.

FIG. 24 illustrates an example relational query to load required members (for a fourth example) in accordance with certain embodiments.

FIG. 26 illustrates an example BI report specification (for a fifth example) in accordance with certain embodiments.

FIG. 27 illustrates an example OLAP query (for a fifth example) in accordance with certain embodiments.

FIG. 28 illustrates an example relational query combining two measures (for a fifth example) in accordance with certain embodiments. FIG. 28 is formed by FIG. 28A and FIG. 28B.

FIG. 29 illustrates a rendered report (for a fifth example) in accordance with certain embodiments.

FIG. 31 illustrates an example OLAP query (for a sixth example) in accordance with certain embodiments.

FIG. 32 illustrates a rendered report (for a sixth example) in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
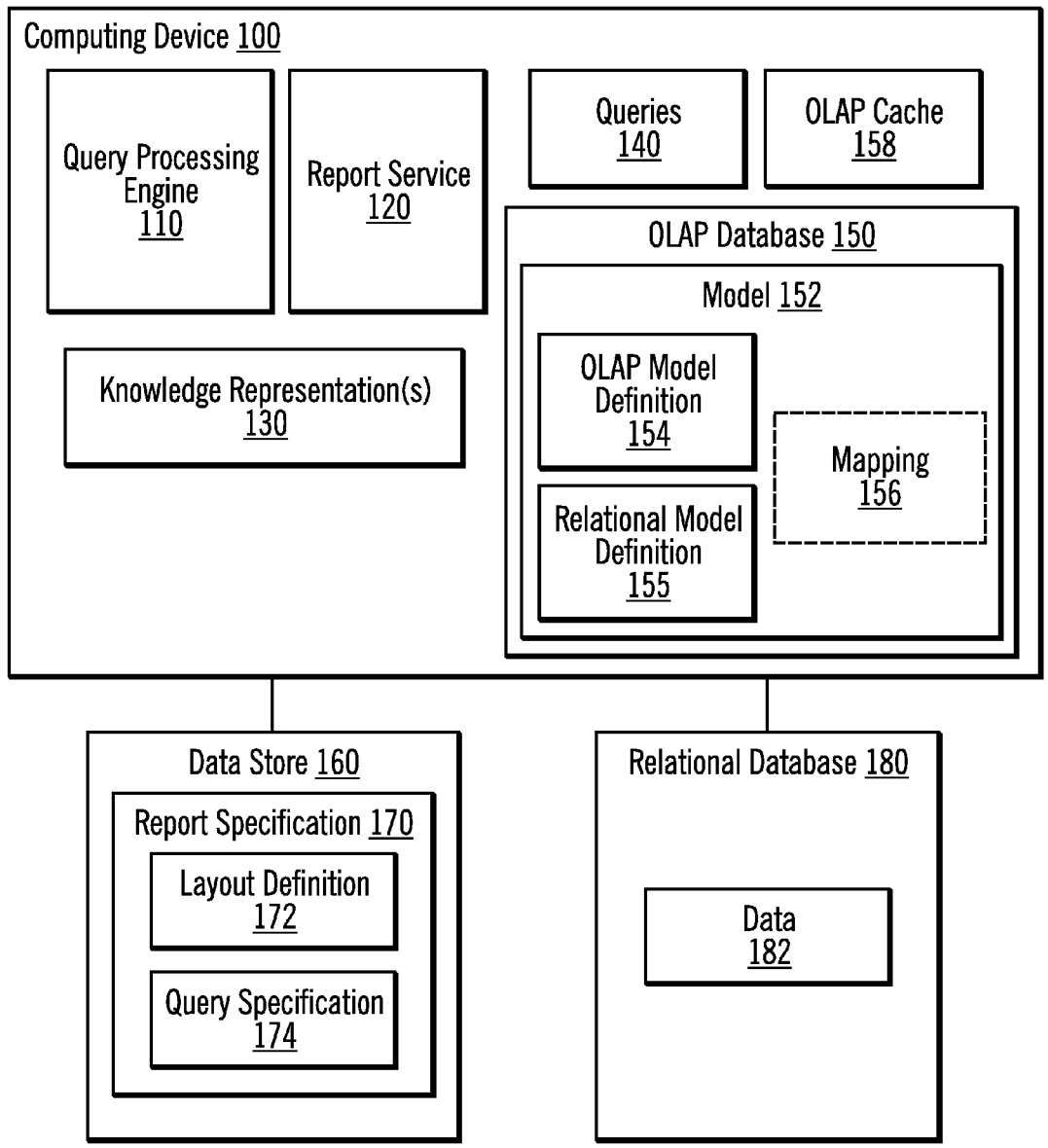
FIG. 1 illustrates a computing environment in accordance with certain embodiments.

FIG. 1 illustrates a computing environment in accordance with certain embodiments. In FIG. 1, a computing device 100 is coupled to a data store 160 and a relational database 180. In certain embodiments, the computing device 100 is a server computer.

The computing device 100 includes a query processing engine 110, a report service 120, one or more knowledge representations 130, queries 140, and an OLAP database 150.

The OLAP database 150 includes a model 152. The model 152 includes an OLAP model definition 154, a relational model definition 155, and a mapping 156 that describes how OLAP model objects map to the relational model objects (e.g., tables and columns). In addition, the data for the OLAP database 150 is stored in an OLAP cache 158 (which is sometimes referred to as a cube). The relational database 180 may be described as containing raw data used to feed the OLAP database 150.

The query processing engine 110 processes queries 140. The queries 140 include different types of queries, such as OLAP queries (e.g., MDX queries) and relational queries (e.g., SQL queries). In certain embodiments, there is a different knowledge representation 130 for each OLAP query. For example, if ten OLAP queries are generated, then ten knowledge representations 130 are generated, one for each of the ten OLAP queries.

In certain embodiments, while processing a single OLAP query that has multiple expressions, the query processing engine 110 stores information in the knowledge representations 130 for that OLAP query. Then, while generating a relational query for a first expression among the multiple expressions, the query processing engine 110 uses the information in the knowledge representation 130 to generate the relational query to retrieve data that is to be used by the first expression and to retrieve data that is to be used by a second, subsequently executed expression among the multiple expressions.

In certain additional embodiments, while processing multiple OLAP queries, the query processing engine 110 stores information in knowledge representations 130. Then, while generating a relational query, the query processing engine 110 uses the information in the knowledge representations 130 to generate the relational query to retrieve data that is to be used by a particular OLAP query and to retrieve data that is to be used by a different, subsequently executed OLAP query.

The data store 160 stores a report specification 170. In particular, a user creates and views a report using the model 152, and the report specification 170 may be described as the report that is stored. The report service 120 receives the report specification 170 and extracts a query specification 174 from the report specification 170. In certain embodiments, the report is a BI report. The relational database 180 stores data 182. This data 182 is retrieved by the executing relational queries and stored in the OLAP database 150. The data 182 in the relational database 180 has row and field (i.e., column) values. The row and field values become members and cell values that are stored in the OLAP database 150.

The query processing engine 110 reduces the number of relational queries that are generated to access and perform table scans on the relational database 180 by efficiently grouping similar relational queries together into a single relational query. This provides performance gain, which is especially useful when reducing the number of table scans over a large relational table. In certain embodiments, the OLAP database 150 is an OLAP cube that has the form of a star schema, which is an example of a relational database schema. The star schema consists of one or more dimension tables referencing a fact table, where each of the dimension tables represents a dimension (e.g., an attribute) of an OLAP cube.

The query processing engine 110 obtains a performance gain by putting together information in the knowledge representation 130 and sharing this information among components (e.g., the report specification 170, the OLAP database 150, and the relational database 180) to allow the components to behave in a more optimal way.

In certain embodiments, the query processing engine 110 collects and shares information using the knowledge representation 130 between components involved when a report is executed against an OLAP database 150. The information collected and shared is used to reduce the number of relational queries and table scans against the underlying relational database.

The report specification 170 has:
A layout definition 172 describing about how to render the result set (i.e., data that is to be used to generate a report).
A query specification 174 that describes how to query the underlying data to produce the result set.
The report specification 170 relies on a semantic layer (i.e., an OLAP model) to identify a metadata object for which a query is to be issued. A semantic layer may be described as an abstract way to refer to any model used to build a report (e.g., an OLAP model, a BI model, a relational model, etc.). A model may be described as a set of structured objects (folder, level, query item, etc.). The user uses these objects from the model to build the report. The report specification 170 then references those objects from the model using Unique Identifiers. For example, if the report has a "sales" column, the report specification 170 references the unique identifier of the "sales" object over the model (e.g. "[model_x].[metrics]. [sales]").

In the same way the semantic layer is an abstraction of the underlying data, the query specification 174 is also data source independent. The query specification 174 captures a query based on the business intelligence domain. For example, if a tabular result has a footer, the query specification 174 has the footer concept. In this context, a footer may be described as a summary of a set of data.

The query processing engine 110 translates the query specification 174 part of the report specification 170 into the native query language of the underlying specific data source that the semantic layer is built from (e.g., an OLAP database, a relational database, a flat file, etc.) That is, the query processing engine 110 generates an OLAP query from the query specification 174. For example, in the case of an OLAP database, this may be an MDX query.

The query processing engine 110 executes the OLAP query against the OLAP database 150. The execution of the OLAP query then causes members and cell values that are not already loaded in the OLAP database 150 to be loaded into the OLAP database 150 by generating relational queries against the relational database 180.

The query processing engine 110 minimizes the number of relational queries against the relational database 180.

In certain embodiments, the query processing engine 110 builds, while planning the query from the initial query specification 174 to the final OLAP query, a knowledge representation 130 of the data to query. In certain embodiments, the knowledge representation 130 is built from the query specification 174, the OLAP model definition 154, the relational model definition 155, and the mapping 156. As the OLAP query executes and causes relational queries to be generated, those relational queries leverage the knowledge representation 130 of the data to find similar and complementary data that each relational query may retrieve at the same time, with little to no extra-cost. This allows reducing the number of relational queries and table scans against the underlying relational database, and provides performance gain on returning the required data to produce the final report.

For example, if the OLAP query references a specific member over an OLAP statement, if the knowledge representation 130 captured the list of other similar references (e.g., a list of other referenced members from the same OLAP level over the OLAP query), instead of querying for this single member, the query processing engine 110 generates a relational query to query for all other similar and related members together. This is about querying the relational database 180 on-demand, but smartly pre-loading the OLAP cache 158 by anticipation of the next OLAP query request.

For example, over a BI query, there may be a high level user concept, such as a footer. When translated over diverse specific query languages (e.g., MDX and SQL), those high level concepts may be lost. For example, the footer may be a calculation over the OLAP query, and the OLAP query has no idea that this calculation is the aggregation of some detail rows referenced somewhere else over the OLAP query. While executing the OLAP query, the query processing engine 110 engine may request the details and later execute the calculations, which will request the aggregation of those same details, but the OLAP query has no notion about this. Keeping a high level reference about the detail and the calculation allows the query processing engine 110 to request information for a current query and a future query at the same time, to avoid having a separate, future request for the data that causes another scan of the fact table. As another example, if an OLAP query execution causes a query a relational fact table for a measure, if the query specification 174 has a sibling measure (i.e., cell values required for the same list of tuples) and this measure is from the same fact table, this second measure is also queried at the same time that the cell values for the first measure are requested.

The following are examples of scenarios in which the knowledge representation 130 may be leveraged to smartly query the relational database:

Multiple references to members from the same level and hierarchy over an OLAP query.

Summary over the query specification 174 (e.g., a header or a footer).

Cell values at different levels of aggregation.

Property referenced over an OLAP query expression or the OLAP dimension properties.

Multiple references to measures.

The query processing engine 110 provides performance gain by minimizing the number of relational table scans. That is, it is less expensive to request more data over a single relational query than issuing multiple relational queries (which cause multiple table scans). The additional data that is retrieved from the relational database 180 may not be required for generating a report, but, since the extra cost to get this additional data is minimal, there is no real performance impact. The overall gain tends to stay higher most of the time. The usage of the knowledge representation 130 during execution allows some level of dynamic planning (i.e., smart decision making during execution based on collected information).

Figure 2A:
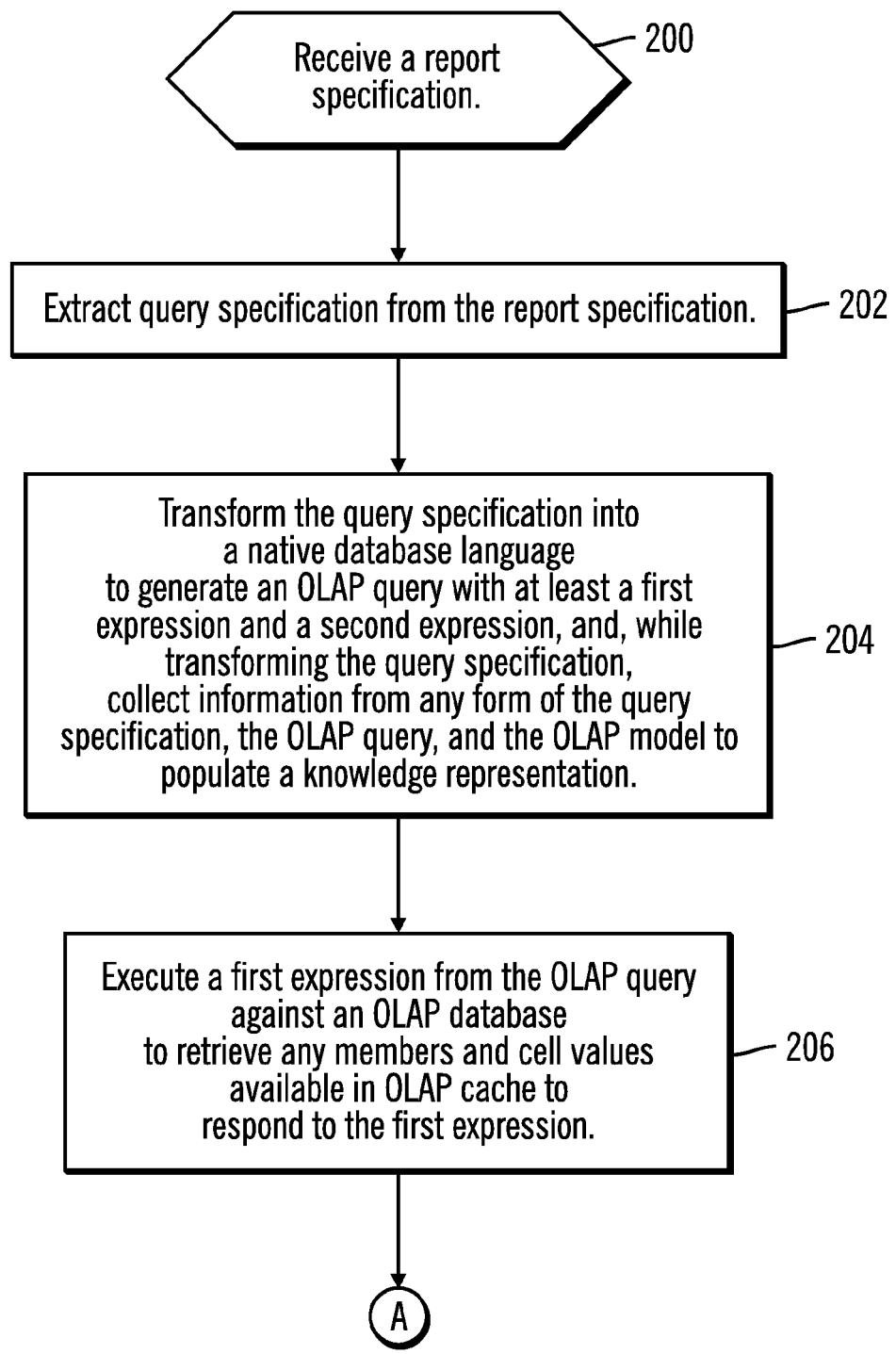
FIG. 2 illustrates, in a flow diagram, processing for generating a report in accordance with certain embodiments.
Figure 2B:
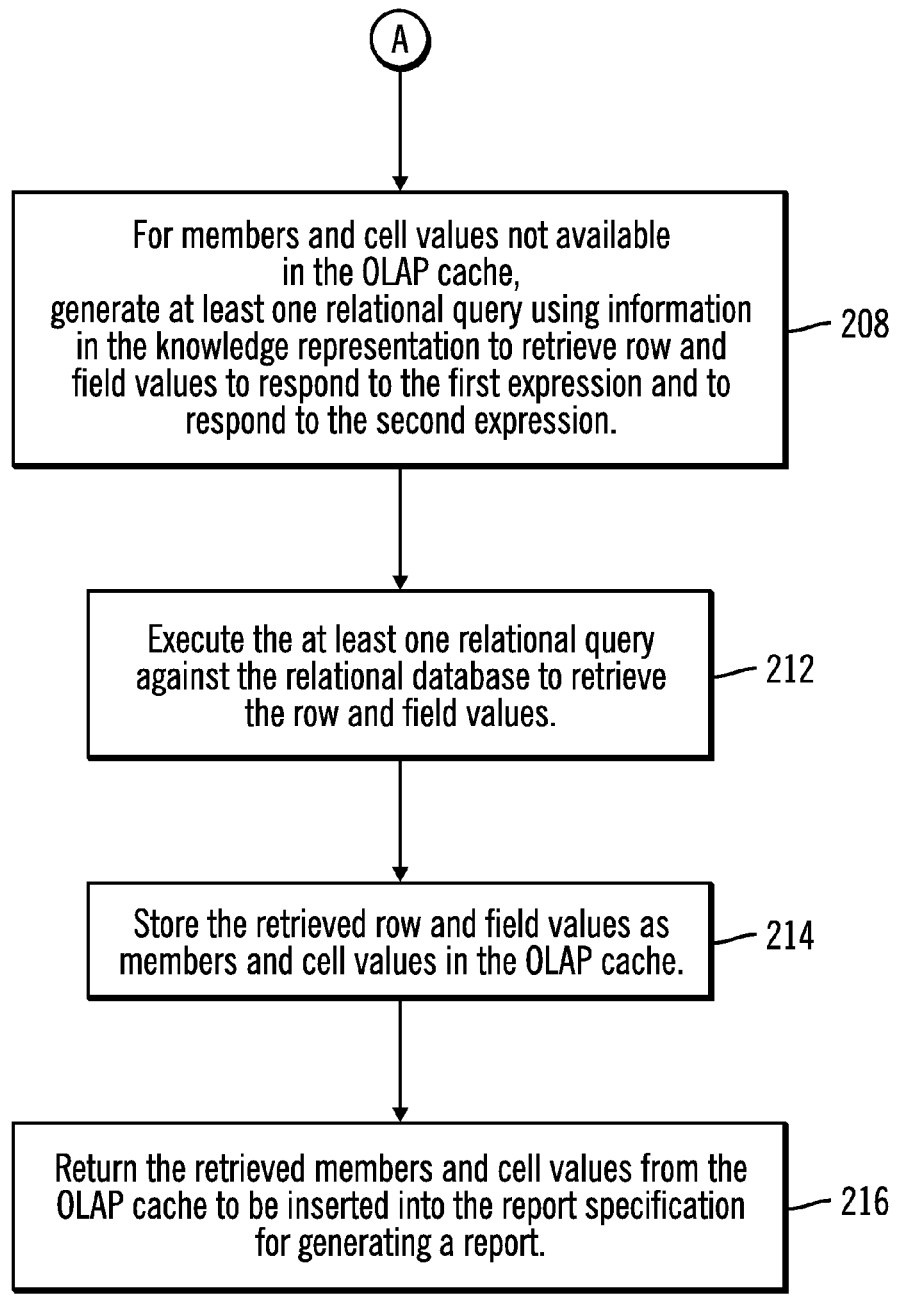

FIG. 2 illustrates, in a flow diagram, processing for generating a report in accordance with certain embodiments. FIG. 2 is formed by FIG. 2A and 2B. Control begins in block 200 with the report service 120 receiving a report specification 170. In particular, a user may be provided with a user interface, and the user builds a report involving diverse reporting element, such as a chart, a list, a cross tabulation, etc. This built report is stored as the report specification 170.

In block 202, the report service 120 extracts a query specification 174 from the report specification 170. The report specification 170 includes the layout definition 172 and the query specification 174. Data (i.e., members and cell values) retrieved from the OLAP database 150 and the relational database 180 is placed into a report using the layout definition 172 to render the report.

In block 204, the query processing engine 110 transforms the query specification 174 into a native database language to generate an OLAP query with at least a first expression and a second expression for the OLAP database 150, and, while transforming the query specification 174, collects information from any form of the query specification 174, the OLAP query, and the OLAP model to populate a knowledge representation. In certain embodiments, the query processing engine 110 uses information about the OLAP model definition 154, the relational model definition 155, and the mapping 156 to identify related members and cell values to be retrieved and adds this information to the knowledge representation 130. In various embodiments, the query processing engine 110 collects information at any stage of the transformation (i.e., at any stage of query planning and execution). In various embodiments, the query processing engine 110 collects the information using any appropriate time at the least expensive cost. For example, the information about the footer may be collected when translating the query footer into an OLAP query calculation (i.e., at the time the planner processes the footer and collects diverse information to do so). For example, the collected information may be about what members and cell values may be grouped and queried together over the relational database 180. If processing a footer, the query processing engine 110 captures information about the footer and what details are needed for the footer.

In block 206, the query processing engine 110 executes the first expression from the OLAP query against the OLAP database 150 to retrieve any members and cell values available in the OLAP cache 158 to respond to the first expression. The OLAP query retrieves members and cell values for each of the expressions to render the report using the report specification 170. In certain embodiments, no members or cell values are retrieved from executing the first expression (e.g., the OLAP database 150 may be empty or may not have the specific members or cell values that are being queried). From block 206 (FIG. 2A), processing continues to block 208 (FIG. 2B).

In block 208, for members and cell values not available in the OLAP cache 158, the query processing engine 110 generates at least one query using information in the knowledge representation 130 to retrieve row and field values to respond to the first expression and to respond to the second expression. The at least one relational query is optimized to load similar content and minimize the number of table scans. Thus, in response to executing a first expression, the query processing engine 130 uses the collected information in the knowledge representation 130 to generate the at least one relational query to retrieve first data to be used to satisfy the first expression and second data to be used to satisfy a second expression.

In block 210, the query processing engine 110 executes the at least one relational query against the relational database 180 to retrieve row and field values.

In block 212, the query processing engine 110 stores the retrieved row and field values as members and cell values in the OLAP cache 158. In particular, the knowledge representation 130 includes information about the members and cell values to be retrieved and relationships between the members and cells. The information is used to build a single relational query to request both the members and cell values to respond to the first expression of the OLAP query and additional members and cell values to respond to the second expression of the OLAP query.

In block 214, the query processing engine 110 returns the retrieved members and cell values from the OLAP cache 158 to be inserted into the report specification 170 for generating the report.

Figure 3:
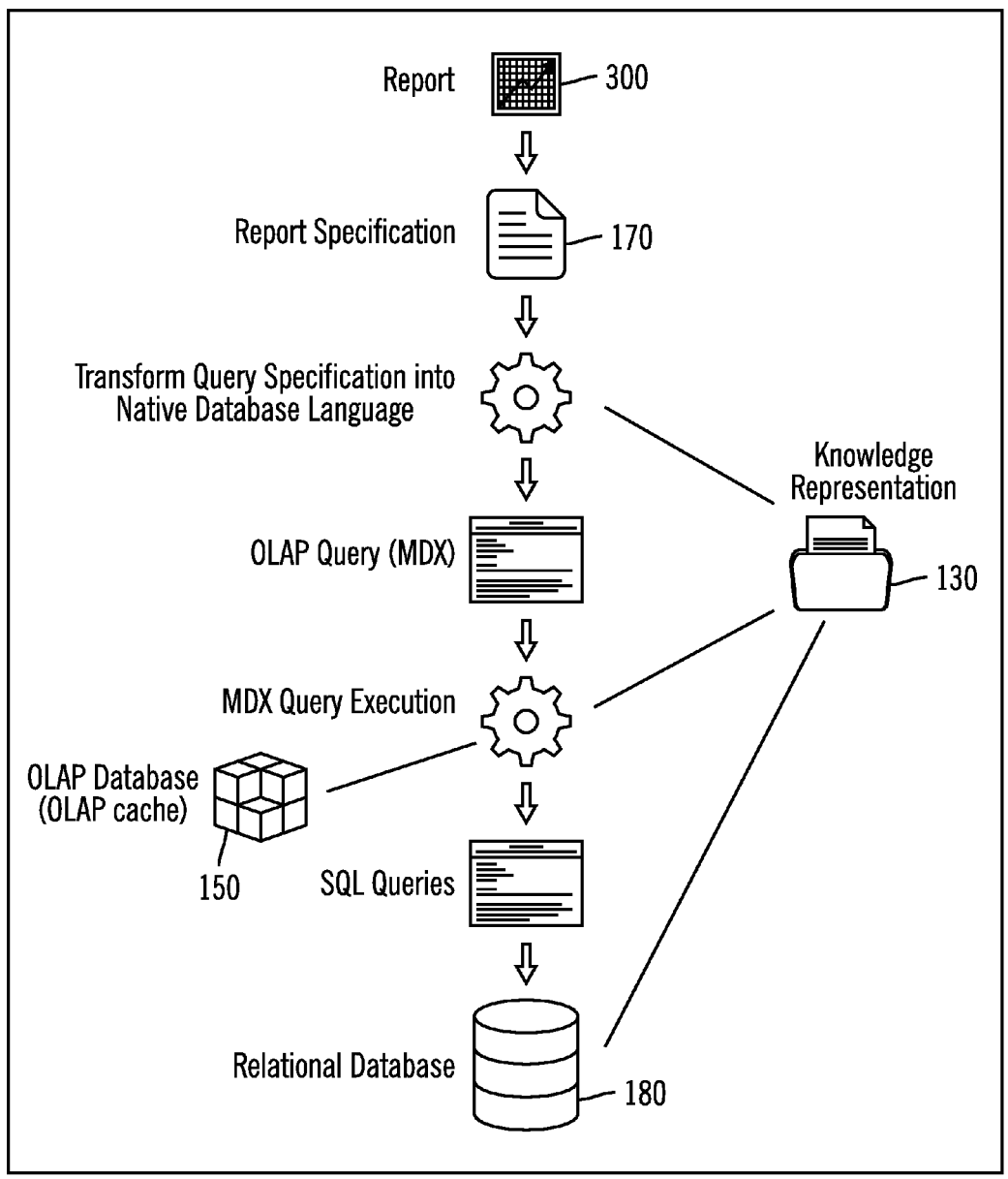
FIG. 3 illustrates relationships of components in FIG. 1 in accordance with certain embodiments.

FIG. 3 illustrates relationships of components in FIG. 1 in accordance with certain embodiments. In particular, a report 300 is received, a report specification 170 corresponding to the report 300 is stored, and a query specification 174 is extracted from the report specification 170. The query specification 174 is transformed to generate an OLAP query, which is executed to retrieve members and cell values from the OLAP database 150. Executing the OLAP query may be said to include generating a relational query using the knowledge representation 130. The relational query is used to retrieve members and cell values from the relational database 180.

Figure 4A:
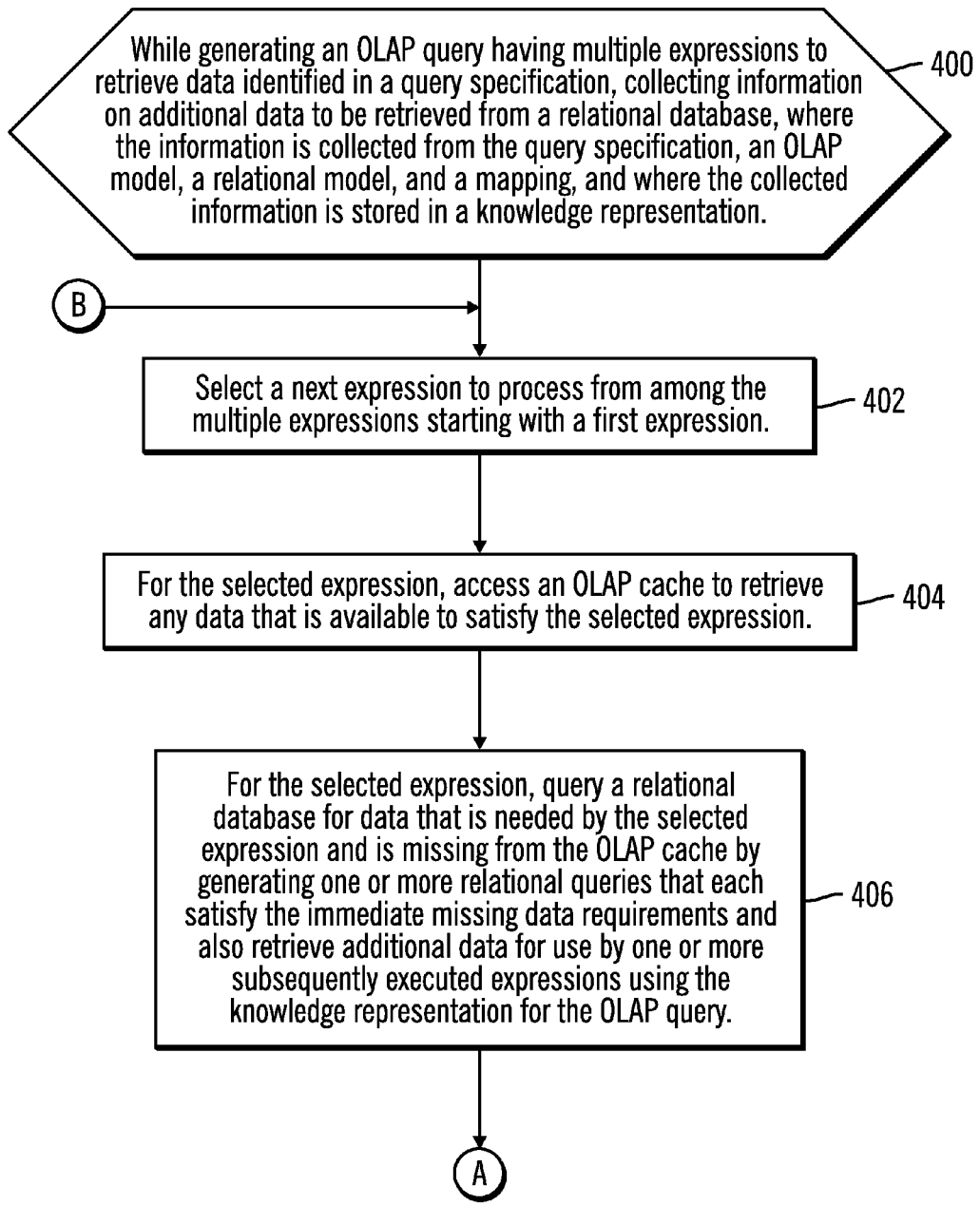
FIG. 4 illustrates, in a flow diagram, operations for enhancing and augmenting relational queries used to retrieve data for a report specification in real time.
Figure 4B:
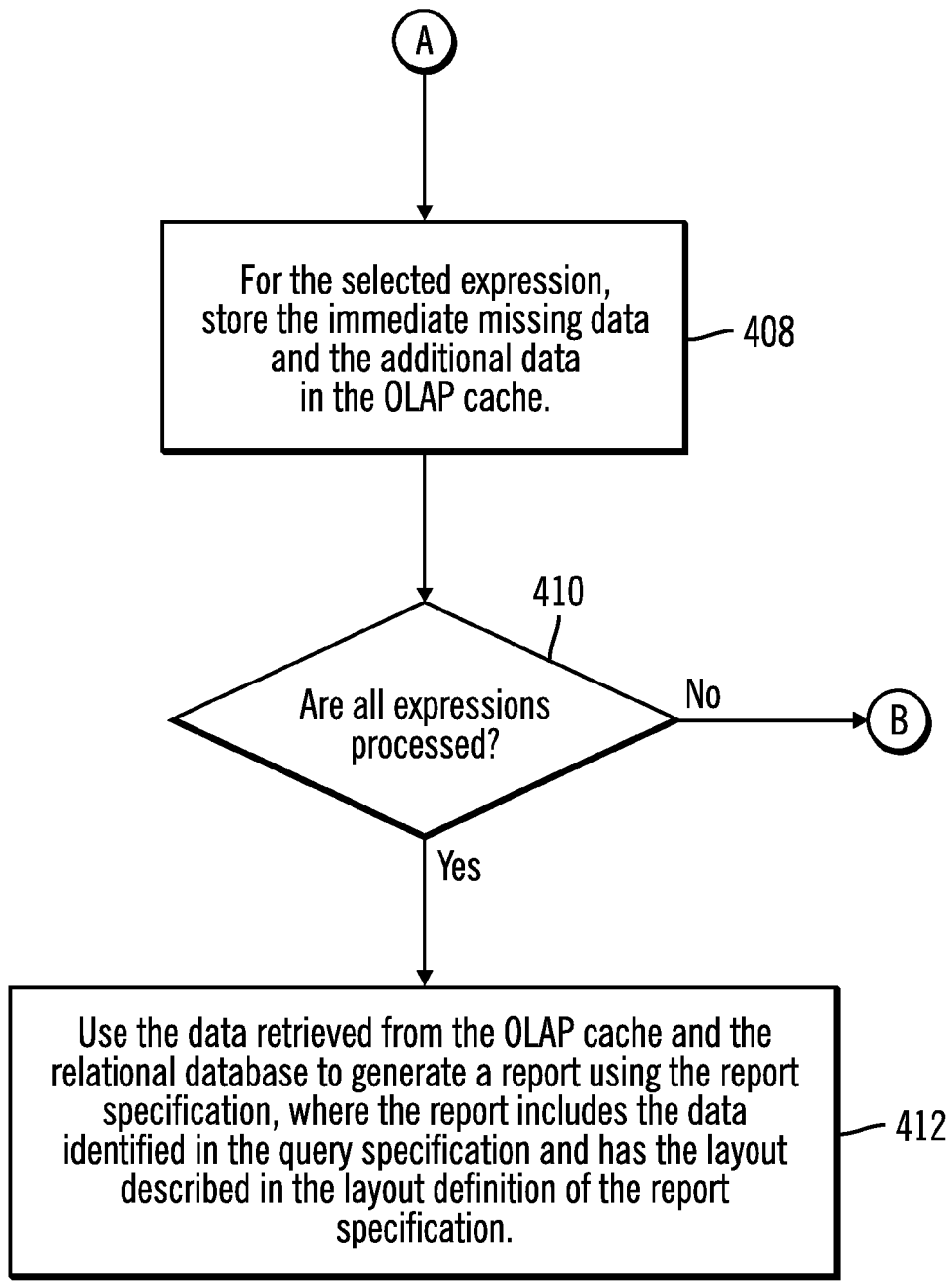

FIG. 4 illustrates, in a flow diagram, operations for enhancing and augmenting relational queries used to retrieve data for a report specification in real time. FIG. 4 is formed by FIG. 4A and 4B. In FIG. 4, control begins in block 400. In block 400, while generating an OLAP query having multiple expressions to retrieve data identified in a query specification 174, the query processing engine 110 collects information on additional data that may be retrieved from the relational database 180, where the information is collected from the query specification 174, an OLAP model (defined in an OLAP model definition 154), a relational model (defined in a relational model definition 155), and a mapping 156, and where the collected information is stored in a knowledge representation 130. In block 402, the query processing engine 110 selects a next expression to process from among the multiple expressions, starting with a first expression.

In block 404, for the selected expression, the query processing engine 110 accesses an OLAP cache 158 to retrieve any data that is available to satisfy the selected expression. The data accessed in the OLAP cache 158 may have been retrieved while processing a previously selected expression.

In block 406, for the selected expression, the query processing engine 110 queries a relational database 180 for data that is needed by the selected expression and is missing from the OLAP cache 158 by generating one or more relational queries that each satisfy the immediate missing data requirements and also retrieve additional data for use by one or more subsequently executed expressions using the knowledge representation 130 for the OLAP query. From block 406 (FIG. 4A), processing continues to block 408 (FIG. 4B). In certain embodiments, there is no need to generate a relational query in block 406 as the needed data was obtained in block 404 (i.e., there is no missing data in the OLAP cache 158).

The data that is needed by the a first expression may be described as first data, while the additional data that may be used by a second, subsequent expression may described as second data.

In block 408, for the selected expression, the query processing engine 110 stores the immediate missing data and the additional data in the OLAP cache 158. In block 410, the query processing engine 110 determines whether all expressions have been processed. If so, processing continues to block 412, otherwise, processing continues to block 402 (FIG. 4A). In block 412, the query processing engine 110 uses the data retrieved from the OLAP cache 150 and the relational database 180 to generate a report using the report specification 170, where the report includes the data identified in the query specification 174 and has the layout described in the layout definition 172 of the report specification 170. The additional data may be used to respond to subsequent executions of expressions of a single OLAP query without generating another relational query for that data.

In certain embodiments, an expression may be a top down tree, in which leaf nodes are evaluated first, then the parent nodes at another level of the tree, until the top node is evaluated. In certain embodiments, each of the nodes in the tree may cause a request over the OLAP cache 158 and trigger a relational query for data that is not available in the OLAP cache 158. Then, the processing of one node may generate a relational query that retrieves data for both that node and another node.

Merely to enhance understanding of embodiments, examples will be provided herein. It is to be understood that embodiments are not to be limited to such examples.

Figure 5:
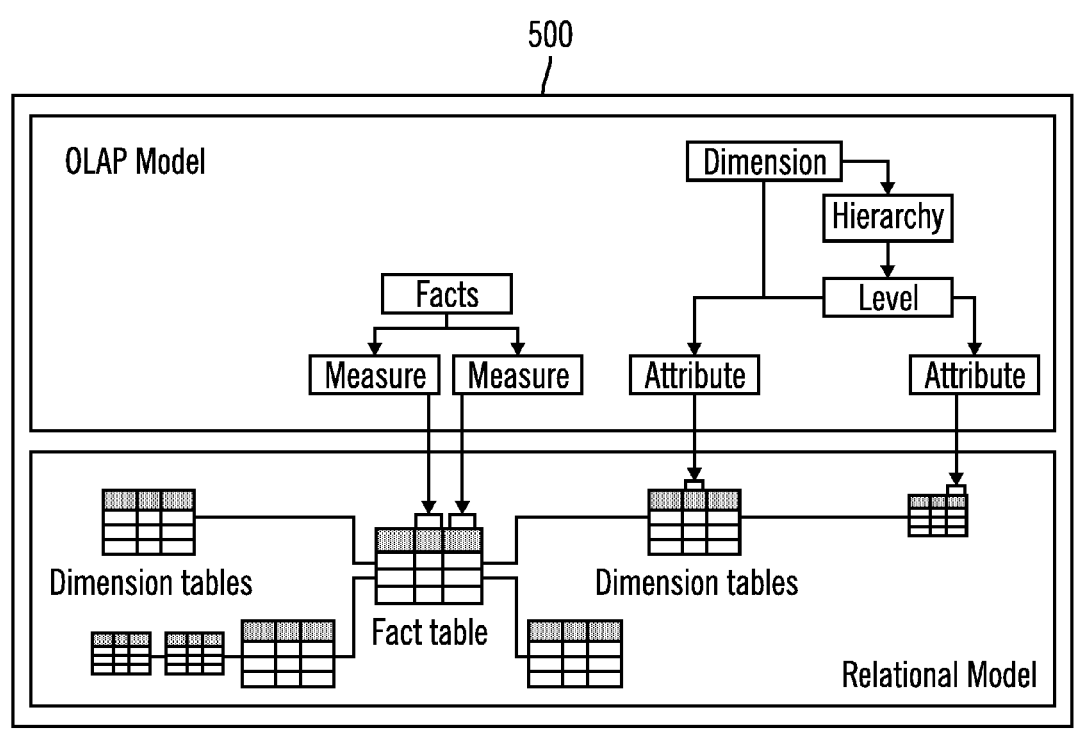
FIG. 5 illustrates an example OLAP model (for a first example) in accordance with certain embodiments.

FIGS. 5-12 describe a first example for a member property in accordance with certain embodiments. FIG. 5 illustrates an example OLAP model 500 in accordance with certain embodiments. The OLAP model 500 includes an OLAP model definition, a relational model definition, and a mapping between the model definitions. The OLAP model definition includes objects (e.g., members, levels, measures, attributes, etc.). The relational model definition includes a fact table and dimension tables. The lines between the OLAP model definition and the relational model definition map objects in the OLAP model definition to objects in the relational model definition. In this first example, the OLAP model 500 is used by a user to create a report by selecting and dragging objects in the OLAP model 500 to the report. The OLAP model (semantic layer) may be described as a hierarchical model that is business and user oriented. The OLAP model 500 may be said to map the OLAP database to the relational database. In certain embodiments, the query processing engine 110 navigates from the semantic layer (i.e., the OLAP model defined by the OLAP model definition 154) down to the relational model (defined by the relational model definition 155) by traversing the OLAP model and following the OLAP model object mapping to the associated relational object.

FIG. 6 illustrates an example BI report specification 600 in accordance with certain embodiments. The report specification 600 includes elements for: the store name, the store manager, and related unit sales. The report specification 600 expresses the query specification and the layout definition in a visual way.

FIG. 7 illustrates an example OLAP query 700 in accordance with certain embodiments. The OLAP query 700 is executed to retrieve data for filling in the report specification 600 to render a report.

In this first example, to load the OLAP database on-demand, the query processing engine 110 will have to generate one or more database queries to retrieve data from the relational database to:

1. Load the store name.
2. Get the store manager property.
3. Get the unit sales values.

The OLAP query 700 has a set expression over each of the axes: Axis (0) and Axis (1). A set expression may be described as an expression returning OLAP members over an OLAP query. With reference to the OLAP query 700, the store name is loaded as part of executing the "[Sales_Store].[Store].[Store Name].MEMBERS" set expression on the Axis (1) of the OLAP query 700. When the set expression on the axis is resolved, the specified property value for "[Sales_Store].[Store].[Store Name].[Store Manager]" is retrieved.

Continuing with this first example, over the report, the user is projecting the "Store Name" OLAP level object and the "Store Manager" OLAP property (or attribute) object.

Over the OLAP query text and the OLAP query execution, both objects are not being executed at the same time and are not next to each other as the objects are in different clause of the OLAP query.

For this first example, assume the OLAP database is empty, without the knowledge representation, on the first execution, the OLAP query could cause a first relational query to load the "Store Name" (executed first) and a second relational query (executed later) to get the "Store Manager" of those "Store Name". FIG. 8 illustrates an example relational query 800 to load store name members in accordance with certain embodiments. FIG. 9 illustrates an example relational query 900 to load the member property in accordance with certain embodiments. That is, when the OLAP database does not have members and cell values needed by the OLAP query and does not have a knowledge representation, this causes the query processing engine 110 to generate a database query to get the "Store Name" member, to perform a lookup to find other OLAP objects from the OLAP query that are related to this same relational table, and to find "Store Manager".

In this first example, the following is done to populate the knowledge representation:

1. Get the list of referenced OLAP objects: Store Name and Store Manager.
2. Access the OLAP model to identify OLAP objects.
3. For each of the OLAP objects, find the mapping to the relational model as follows:
   a. Store Name level->Store Name column over the store table.
   b. Store Manager property->Store Manager column over the store table.
4. Group OLAP objects coming from the same relational database table.

The query processing engine 110 traverses the OLAP model down to the relational model through the defined mapping between the two models (e.g., shown in FIG. 5).

In particular, for this first example, the knowledge representation has the following information:

Store name members
Store manager property values
Store manager is a property of the store name members
Store name members is from store table
Store manager property values is from the store table Since the members and property values are from the same relational table, the cost of getting the property values at the same time as the members is minimal, whereas retrieving the property values later requires a second relational query, which involves another table scan and data retrieval.

The rule over the knowledge representation in such a case is to automatically augment the first query to load the members and to also pre-load the property values. FIG. 10 illustrates an example relational query 1000 to load both members and property values in accordance with certain embodiments. FIG. 11 illustrates a rendered report 1200 in accordance with certain embodiments.

FIG. 12 illustrates an example of another OLAP query 1200 in accordance with certain embodiments. In the OLAP query 1100, the set expression on the axis involves some filtering. The evaluation of the filter expression may discard some members in some cases. In such a case, more member properties than required may be pre-loaded. Still, as part of loading the members, loading the property values at the same time stays lower than any future database query to get the property values for a sub-set of the members. In particular, without the knowledge representation, some of the "Store Name" members may have been filtered out and the second query to load the "Store Manager" may be for a shorter list. Regardless, the relational query is over the same relational table (but different columns).

FIGS. 13-18 describe a second example for multiple levels from a same relational database table in accordance with certain embodiments.

Figure 13:
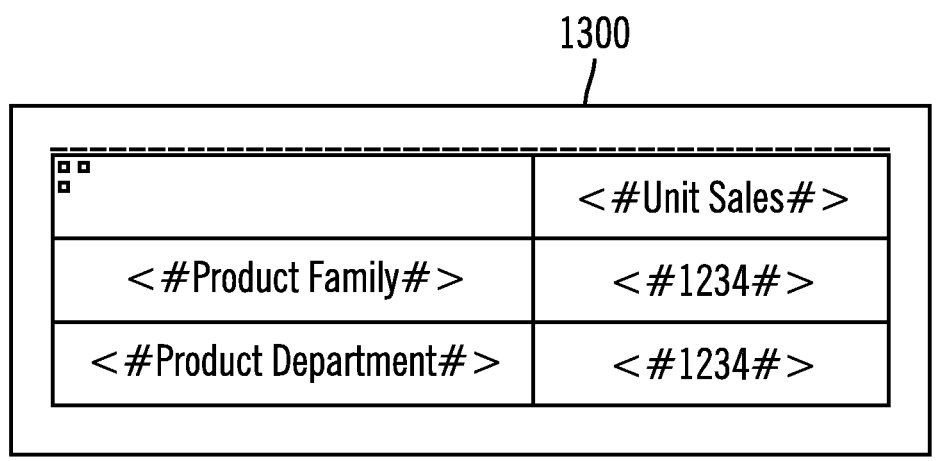
FIG. 13 illustrates an example BI report specification (for a second example) in accordance with certain embodiments.

FIG. 13 illustrates an example BI report specification 1300 in accordance with certain embodiments. The BI report specification 1300 shows Unit Sales value of every Product Family and every Product Department.

For this second example, the Product Family and Product Department are at unique levels defined in a product hierarchy. This means that a key's data defined for that particular level can identify itself without any reference to any parent level.

FIG. 14 illustrates an example OLAP query 1400 in accordance with certain embodiments.

In this second example, to load the OLAP database on-demand, the query processing engine 110 will have to generate one or more database queries to retrieve data from the relational database to:

1. Load Product Family members.
2. Load Product Department members.

The set expression projected on Axis(1) of the OLAP query 700 has two portions. Without the knowledge representation, the query processing engine 110 would resolve each portion in the order that it appears in the set expression. The query processing engine 110 loads Product Family level first, then loads the Product Department level. The result of the set expression is the union of the two portions.

For this second example, the knowledge representation has the following information:
   Query references Product Family level
   Query references Product Department level
   Product Family level and Product Department level are defined based on the same relational database table Because members from Product Family level and Product Department level are form the same relational table, the query processing engine 110 uses the knowledge of the OLAP query to generate a single relational query to load both levels. This provides much better performance than generating two relational queries.

Figure 16:
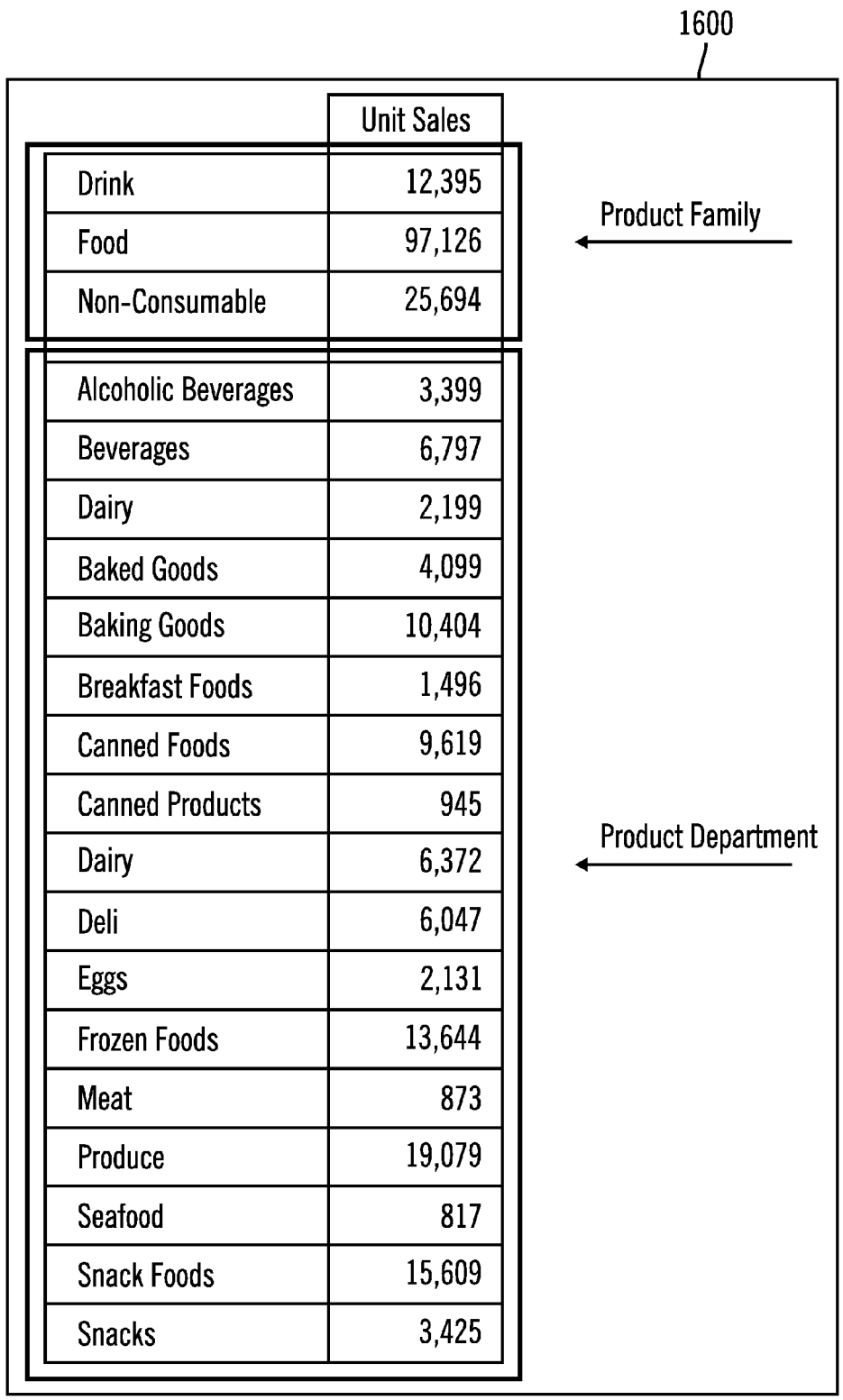
FIG. 16 illustrates a rendered report (for a second example) in accordance with certain embodiments.

FIG. 15 illustrates an example relational query 1500 to load both levels in accordance with certain embodiments. FIG. 16 illustrates a rendered report 1600 in accordance with certain embodiments.

FIGS. 17-21 describe a third example for cell values at different levels of aggregation in accordance with certain embodiments.

Figure 17:
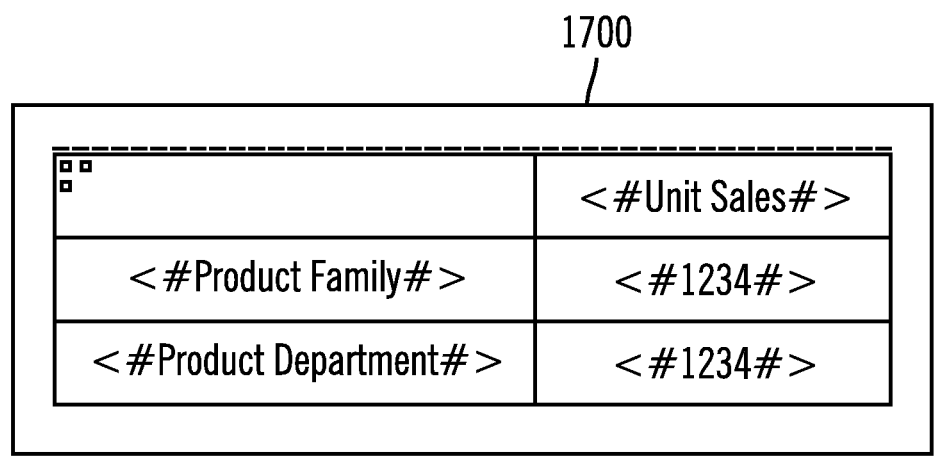
FIG. 17 illustrates an example BI report specification (for a third example) in accordance with certain embodiments.

FIG. 17 illustrates an example BI report specification 1700 in accordance with certain embodiments. The BI report specification 1700 shows Unit Sales value of every Product Family and every Product Department.

Figure 19:
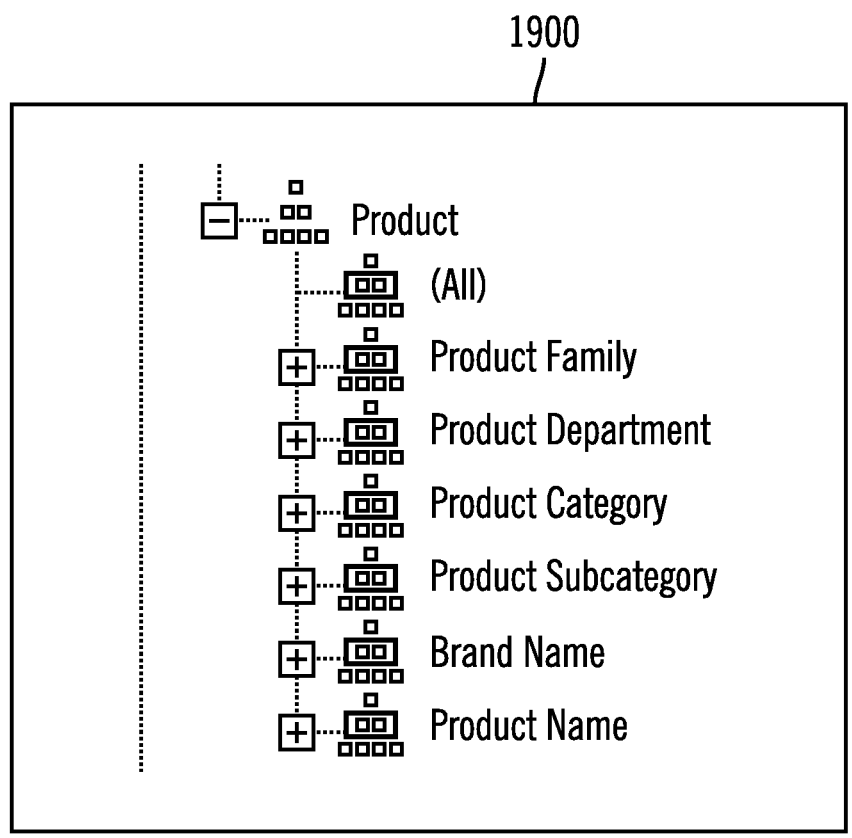
FIG. 19 illustrates an example product hierarchy (for a third example) in accordance with certain embodiments.

FIG. 18 illustrates an example OLAP query 1800 in accordance with certain embodiments. FIG. 19 illustrates an example product hierarchy 1900 in accordance with certain embodiments. Product Family and Product Department are different levels defined in the product hierarchy 1900.

In this third example, to load the OLAP database on-demand, the query processing engine 110 will have to generate one or more database queries to retrieve data from the relational database to:
1. Get Unit Sales values for Product Department level
2. Get Unit Sales values for Product Family level In this third example, the finest granularity of Unit Sales value is at Product Name level in a relational table. Unit Sales value of a Product Department is the aggregate of a corresponding Product Name's Unit Sales values. Unit Sales value of a Product Family is calculated in the same way. However, computing Unit Sales value for a Product Family member needs different data than computing Unit Sales value for a Product Department member. When both Product Family level and Product Department level are present in an OLAP query, the query processing engine 110 has to fetch values for these two level of aggregations separately when the knowledge representation is not available.

In this third example, the knowledge representation has the following information:
   Query references Product Family level and needs to compute Unit Sales value for this level
   Query references Product Department level and needs to compute Unit Sales value for the level
   Product Family is the parent level of Product Department
   For any Product Family member, all children are included in the query The query processing engine 110 uses the knowledge representation to generate a single relational query to fetch values for both the Product Family level and the Product Department level together. This reduces the number of relational queries being created.

FIG. 20 illustrates an example relational query 2000, 2010, 2012 to load two levels of aggregation in accordance with certain embodiments. FIG. 21 illustrates a rendered report 2100 in accordance with certain embodiments.

FIGS. 22-25 describe a fourth example for partial member loading in accordance with certain embodiments.

Figure 22:
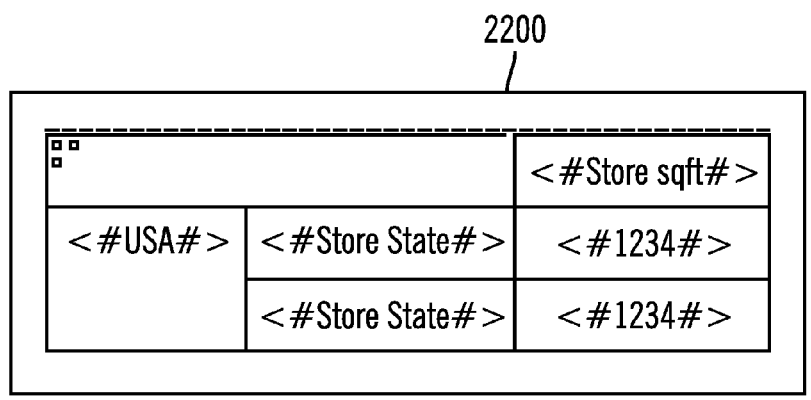
FIG. 22 illustrates an example BI report specification (for a fourth example) in accordance with certain embodiments.

FIG. 22 illustrates an example BI report specification 2200 in accordance with certain embodiments. The BI report specification 2200 shows Store Sqft for states in the USA.

FIG. 23 illustrates an example OLAP query 2300 in accordance with certain embodiments.

In this fourth example, to load the OLAP database on-demand, the query processing engine 110 will have to generate one or more database queries to retrieve data from the relational database to:
1. Load Store Country members
2. Load Store State members
3. Load cell values for members in the final result When the knowledge representation is not available, loading the entire Store State level is triggered when the following expression is evaluated:
DESCENDANTS([Sales_Store].[Store].[All Stores].[USA], [Sales_Store].[Store].[Store State]) projected on AXIS(1). The query processing engine needs all members from Store State level available when determining which member on that level is a descendant of USA.

Figure 25:
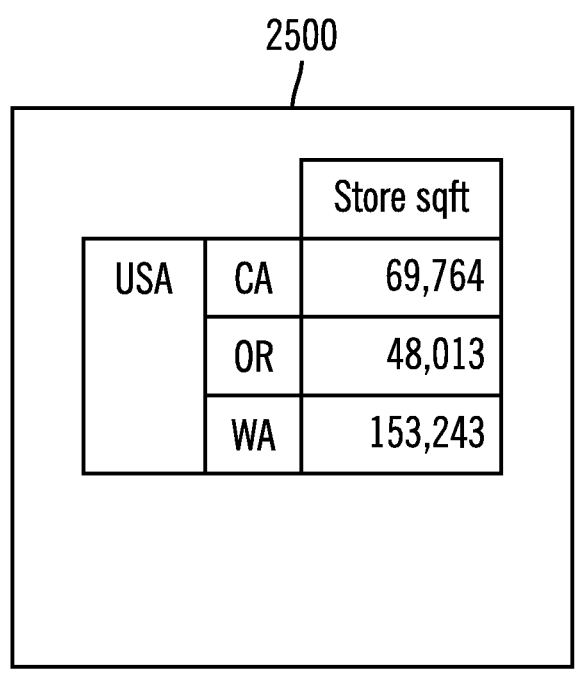
FIG. 25 illustrates a rendered report (for a fourth example) in accordance with certain embodiments.

In this fourth example, the knowledge representation has the following information:
   Query references member USA from Store Country level
   The result of the query only involves members correlated with USA The query processing engine 110 uses the knowledge representation to generate a relational query that only loads part of Store Country level and part of Store State level. The query processing engine 110 evaluates the query using partially loaded levels, and the result is correct and is the same as when an entire level is loaded. The knowledge representation allows the query processing engine 110 to avoid loading more data than needed when it can safely operate on part of the data. FIG. 24 illustrates an example relational query 2400 to load required members in accordance with certain embodiments. FIG. 25 illustrates a rendered report 2500 in accordance with certain embodiments.

FIGS. 26-29 describe a fifth example for combining multiple measures together in accordance with certain embodiments.

FIG. 26 illustrates an example BI report specification 2600 in accordance with certain embodiments. The BI report specification 2600 shows Unit Sales and a calculation involving Store Cost (i.e., Store Cost subtracts a constant value $10,000) for every Product Family.

FIG. 27 illustrates an example OLAP query 2700 in accordance with certain embodiments.

In this fifth example, to load the OLAP database on-demand, the query processing engine 110 will have to generate one or more database queries to retrieve data from the relational database to:
1. Load the product family members
2. Load Unit Sales values
3. Load Store Cost values In the OLAP query 2600, Unit Sales is directly projected on an axis, and Store Cost is part of a calculation. The query processing engine 110 needs the value of those two measures at different times when evaluating the OLAP query 2600.

When the query processing engine 110 cannot access the knowledge representation, this causes the value of each measure to be loaded separately, which generates two relational queries scanning the same fact table.

In this fifth example, the knowledge representation will have the following information:

1. The query references two measures Unit Sales and Store Cost.
2. Value of Unit Sales and Store Cost comes from same relational fact table.

The query processing engine 110 uses the knowledge representation to generate a single relational query to combine two measures Unit Sales and Store Cost together. This happens when the query processing engine 110 evaluates the first measure encountered, and the value of the second measure is queried together with the first measure. Then, the value of the second measure is ready for use when the query processing engine 100 needs it. This reduces the number of relational queries need to be planned and executed and avoids scanning the fact table multiple times.

FIG. 28 illustrates an example relational query 2800, 2810 combining two measures in accordance with certain embodiments. FIG. 28 is formed by FIG. 28A and FIG. 28B. FIG. 29 illustrates a rendered report 2900 in accordance with certain embodiments.

Figure 30:
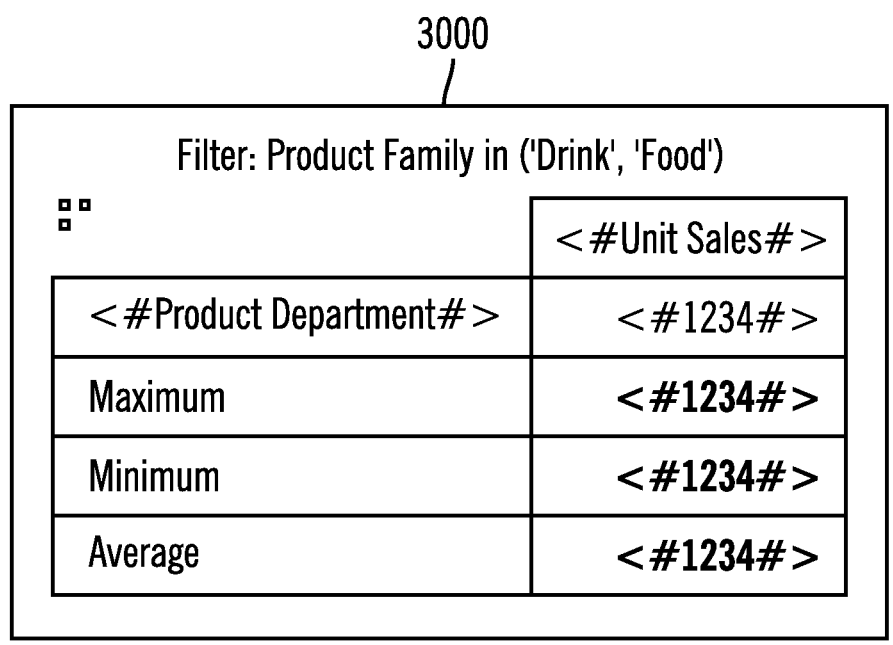
FIG. 30 illustrates an example BI report specification (for a sixth example) in accordance with certain embodiments.

FIGS. 30-32 describe a sixth example for a summary on an arbitrary list of members in accordance with certain embodiments.

FIG. 30 illustrates an example BI report specification 3000 in accordance with certain embodiments. The BI report specification 3000 shows the product department and related unit sales. The BI report specification 3000 is filtered to a subset of product families. The BI report specification 3000 has three summaries.

FIG. 31 illustrates an example OLAP query 3100 in accordance with certain embodiments.

In this sixth example, to load the OLAP database on-demand, the query processing engine 110 will have to generate one or more database queries to retrieve data from the relational database to:

1. Load the product family members
2. Load the unit sales values (using sum of them)
3. Evaluate each of the calculated members (summary) to get the cell values for the following:
   a. The unit sales minimum.
   b. The unit sales maximum.
   c. The unit sales average.

Without the knowledge representation, the query processing engine 110 may generate up to five relational queries.

For this sixth example, the knowledge representation has the following information:
  Product Family and unit sales are projected details
  There is a visible summary for product family and unit sales measures:
    Minimum: Calculated member
    Maximum: Calculated member
    Average: Calculated member When the query processing engine 110 requests cell values for the product family, the query processing engine 110 also loads the visible summary related to the same measure.

Since those cell values belong to members that do not exist over the product hierarchy, the cell values are loaded in the corresponding calculated member OLAP cache. This is the cache used to avoid evaluating the same calculated member in the same context more than once. When the query processing engine 110 starts evaluating the calculated member expression, the query processing engine uses the values in the cache first, when they exist in the cache. Since the values are already cached, then the query processing engine avoids evaluating those expressions again.

FIG. 32 illustrates a rendered report 3200 in accordance with certain embodiments.

Figure 33:
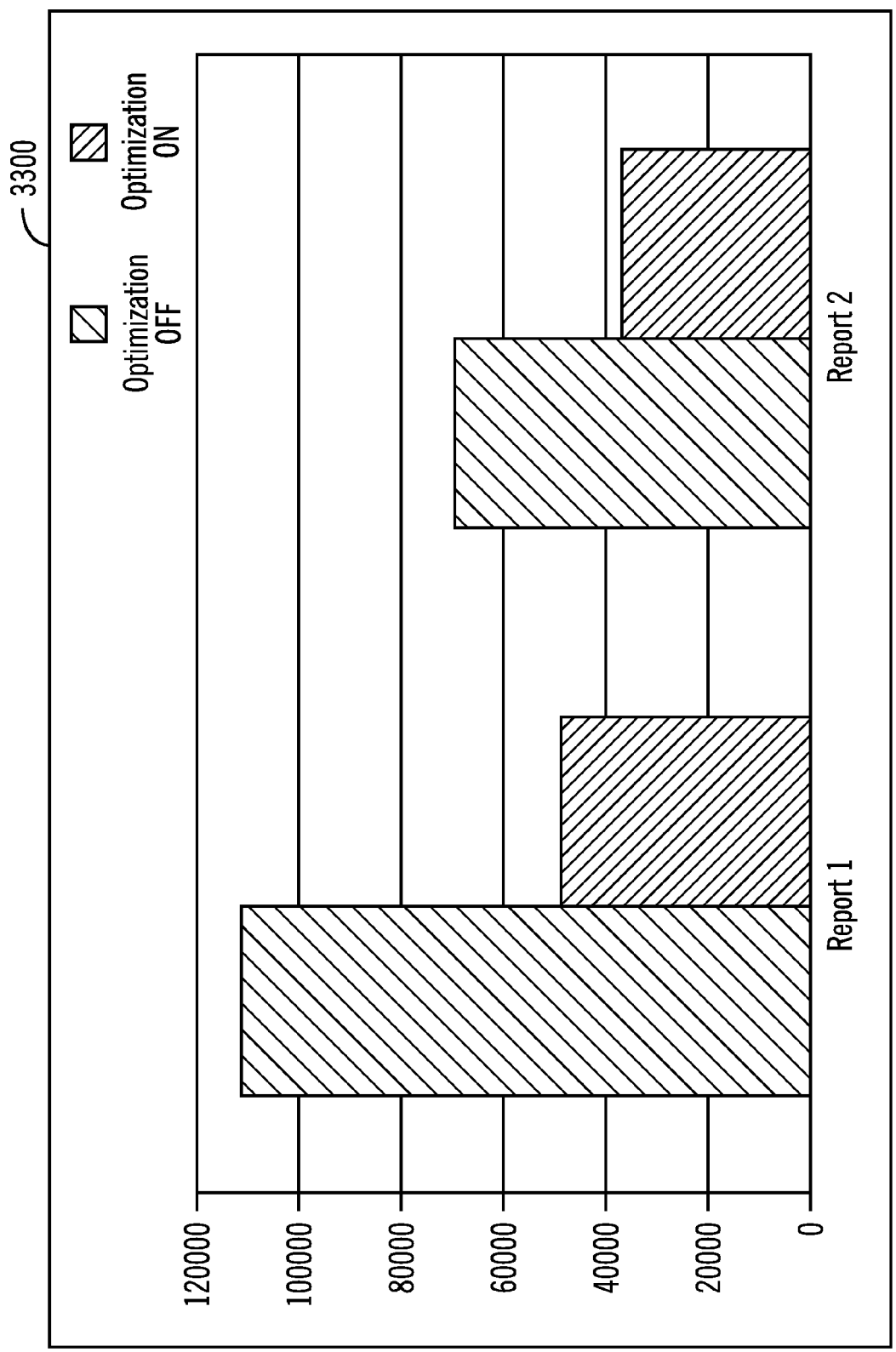
FIG. 33 illustrates a performance comparison for reports in accordance with certain embodiments.
Figure 34:
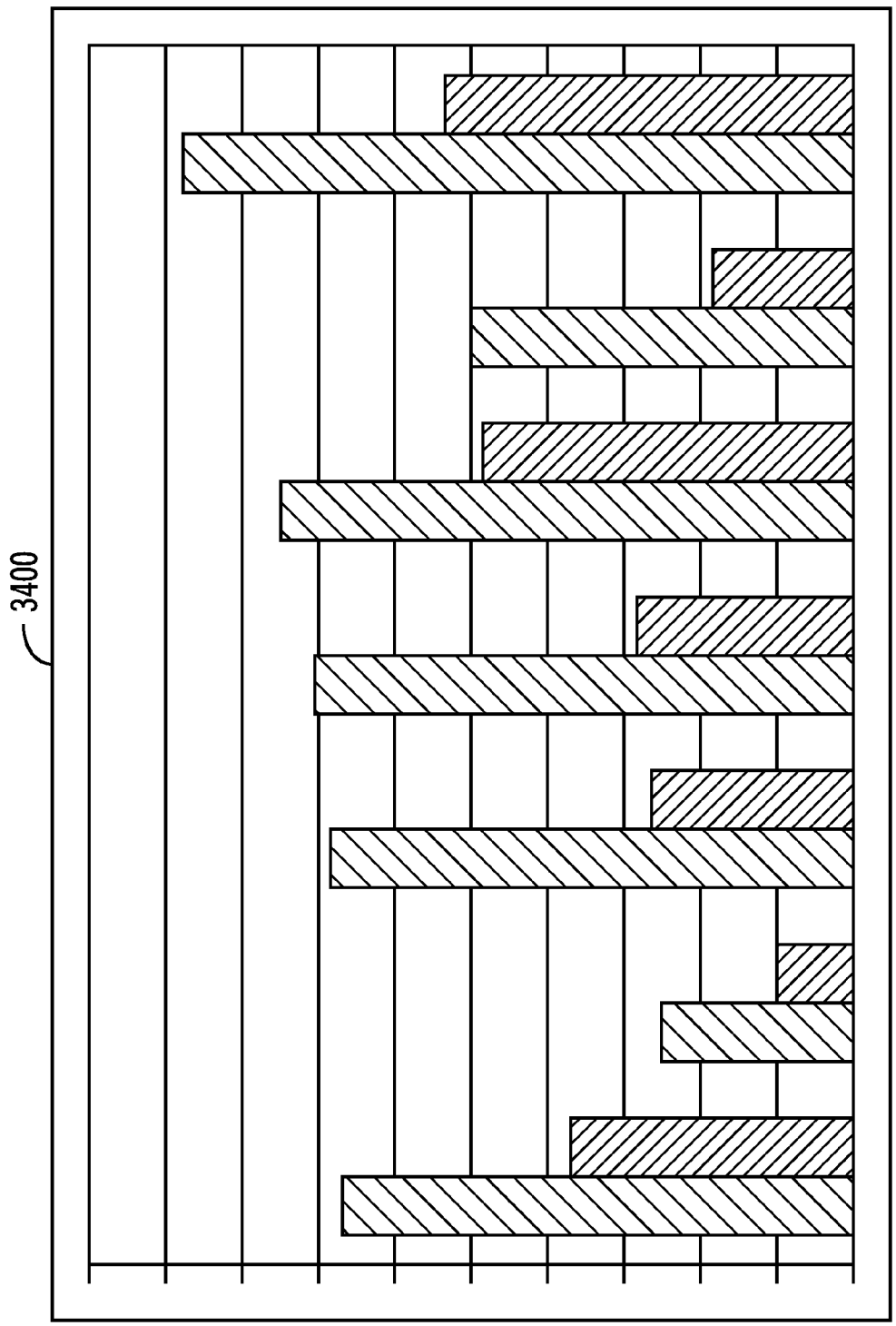
FIG. 34 illustrates a performance comparison for other reports in accordance with certain embodiments.

Thus, the examples show that embodiments are application to:
  Member Properties
  Member Levels
  Multiple Aggregation Levels
  Partial Member Loading
  Combined Measures
  An Arbitrary List of Members FIG. 33 illustrates a performance comparison for reports in accordance with certain embodiments. In FIG. 33, the execution time is in milliseconds. The time includes the entire Business Intelligence stack. FIG. 34 illustrates a performance comparison for other reports in accordance with certain embodiments. In FIGS. 33 and 34, the lower bars represent processing using the knowledge representation (i.e., optimization on), and the taller bars represent processing without using the knowledge representation (i.e., optimization off).

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 35:
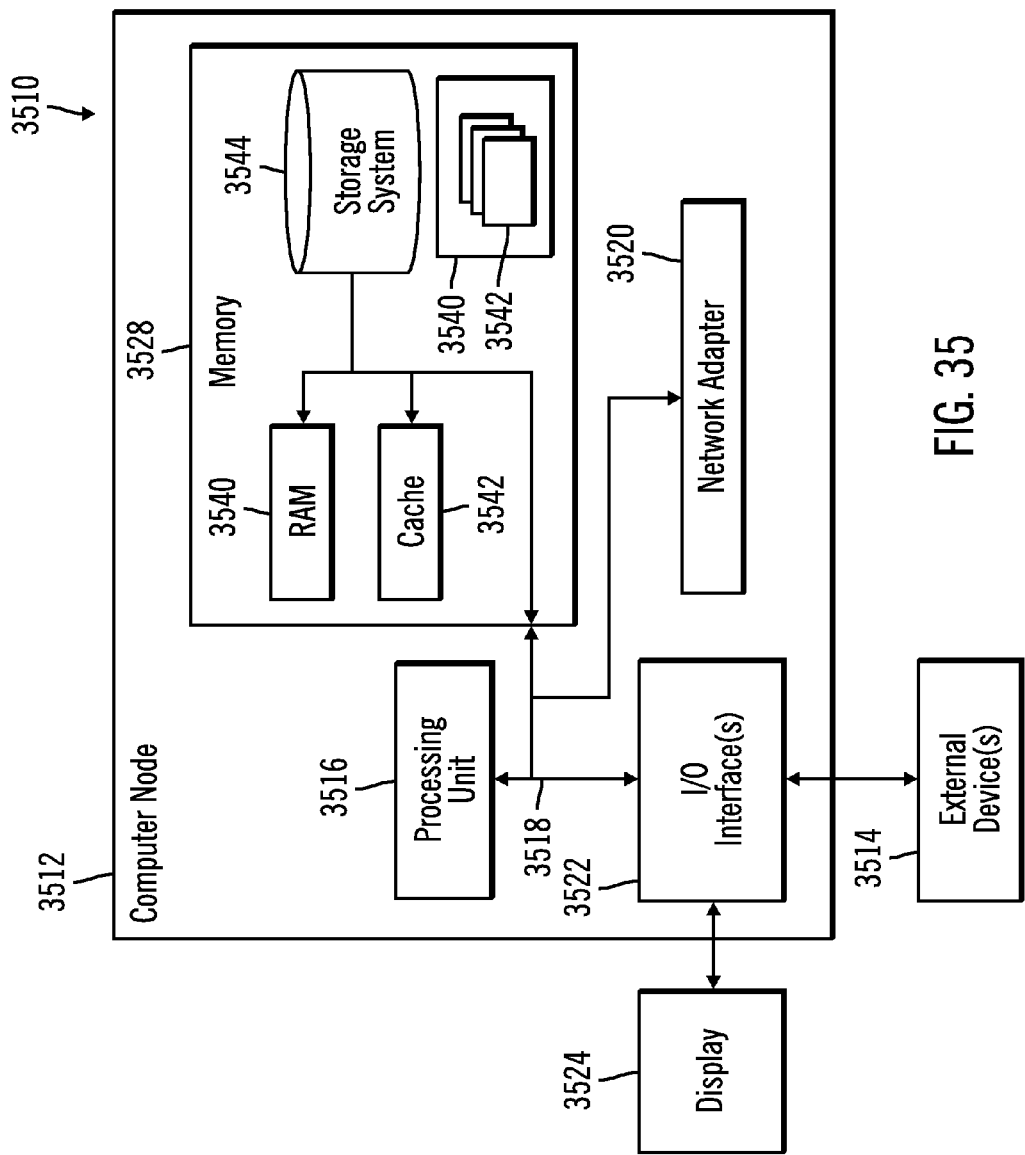
FIG. 35 depicts a cloud computing node in accordance with certain embodiments.

Referring now to FIG. 35, a schematic of an example of a cloud computing node is shown. Cloud computing node 3510 is only one example of a suitable cloud computing node and is not intended to suggest any limitation as to the scope of use or functionality of embodiments of the invention described herein. Regardless, cloud computing node 3510 is capable of being implemented and/or performing any of the functionality set forth hereinabove.

In cloud computing node 3510 there is a computer system/server 3512, which is operational with numerous other general purpose or special purpose computing system environments or configurations. Examples of well-known computing systems, environments, and/or configurations that may be suitable for use with computer system/server 3512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 3512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 3512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 35, computer system/server 3512 in cloud computing node 3510 is shown in the form of a general-purpose computing device. The components of computer system/server 3512 may include, but are not limited to, one or more processors or processing units 3516, a system memory 3528, and a bus 3518 that couples various system components including system memory 3528 to a processor or processing unit 3516.

Bus 3518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 3512 typically includes a variety of computer system readable media. Such media may be any available media that is accessible by computer system/server 3512, and it includes both volatile and non-volatile media, removable and non-removable media.

System memory 3528 can include computer system readable media in the form of volatile memory, such as random access memory (RAM) 3530 and/or cache memory 3532. Computer system/server 3512 may further include other removable/non-removable, volatile/non-volatile computer system storage media. By way of example only, storage system 3534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 3518 by one or more data media interfaces. As will be further depicted and described below, memory 3528 may include at least one program product having a set (e.g., at least one) of program modules that are configured to carry out the functions of embodiments of the invention.

Program/utility 3540, having a set (at least one) of program modules 3542, may be stored in memory 3528 by way of example, and not limitation, as well as an operating system, one or more application programs, other program modules, and program data. Each of the operating system, one or more application programs, other program modules, and program data or some combination thereof, may include an implementation of a networking environment. Program modules 3542 generally carry out the functions and/or methodologies of embodiments of the invention as described herein.

Computer system/server 3512 may also communicate with one or more external devices 3514 such as a keyboard, a pointing device, a display 3524, etc.; one or more devices that enable a user to interact with computer system/server 3512; and/or any devices (e.g., network card, modem, etc.) that enable computer system/server 3512 to communicate with one or more other computing devices. Such communication can occur via Input/Output (I/O) interfaces 3522. Still yet, computer system/server 3512 can communicate with one or more networks such as a local area network (LAN), a general wide area network (WAN), and/or a public network (e.g., the Internet) via network adapter 3520. As depicted, network adapter 3520 communicates with the other components of computer system/server 3512 via bus 3518. It should be understood that although not shown, other hardware and/or software components could be used in conjunction with computer system/server 3512. Examples, include, but are not limited to: microcode, device drivers, redundant processing units, external disk drive arrays, RAID systems, tape drives, and data archival storage systems, etc.

Figure 36:
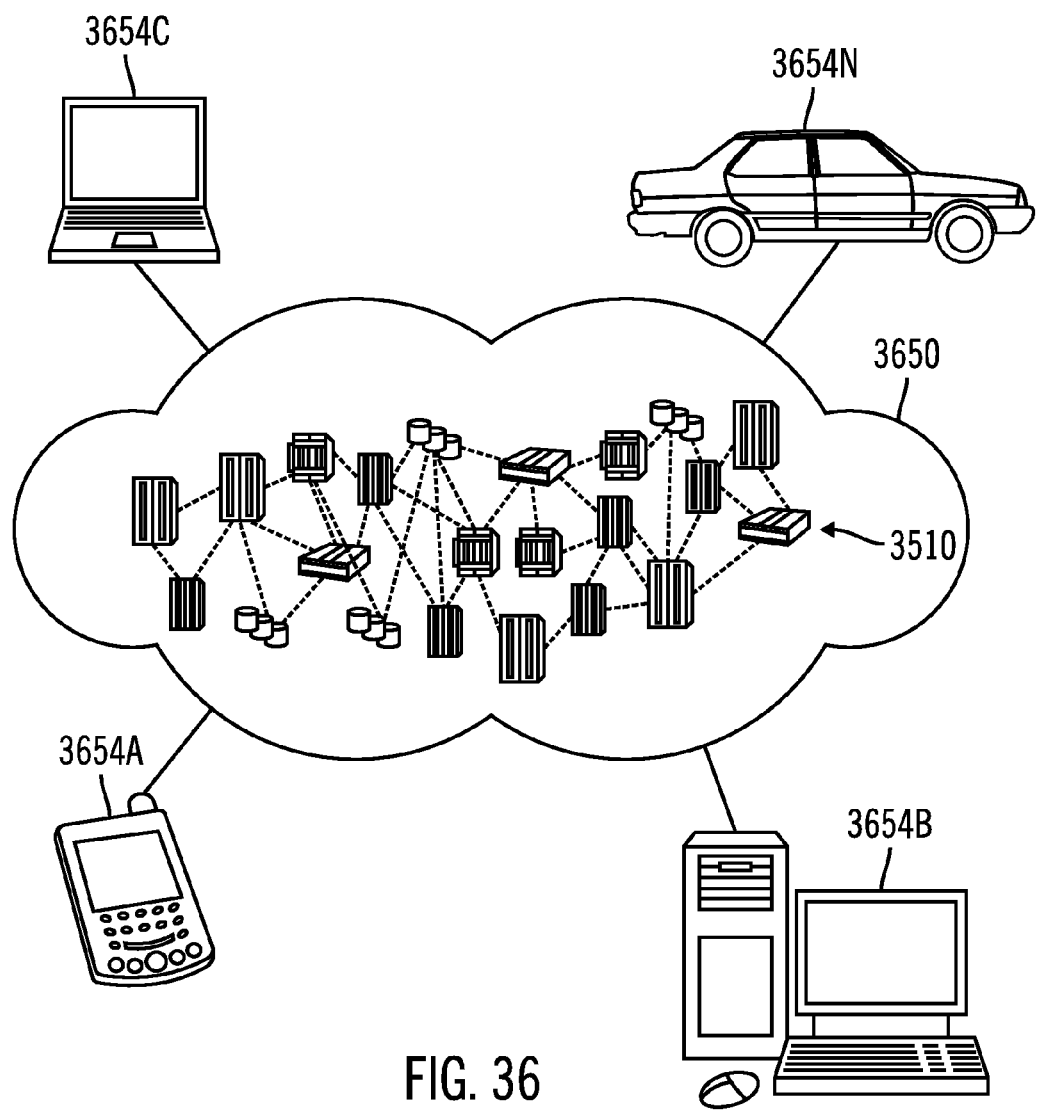
FIG. 36 depicts a cloud computing environment in accordance with certain embodiments.

Referring now to FIG. 36, illustrative cloud computing environment 3650 is depicted. As shown, cloud computing environment 3650 comprises one or more cloud computing nodes 3510 with which local computing devices used by cloud consumers, such as, for example, personal digital assistant (PDA) or cellular telephone 3654A, desktop computer 3654B, laptop computer 3654C, and/or automobile computer system 3654N may communicate. Nodes 3510 may communicate with one another. They may be grouped (not shown) physically or virtually, in one or more networks, such as Private, Community, Public, or Hybrid clouds as described hereinabove, or a combination thereof. This allows cloud computing environment 3650 to offer infrastructure, platforms and/or software as services for which a cloud consumer does not need to maintain resources on a local computing device. It is understood that the types of computing devices 3654A-N shown in FIG. 36 are intended to be illustrative only and that computing nodes 3510 and cloud computing environment 3650 can communicate with any type of computerized device over any type of network and/or network addressable connection (e.g., using a web browser).

Figure 37:
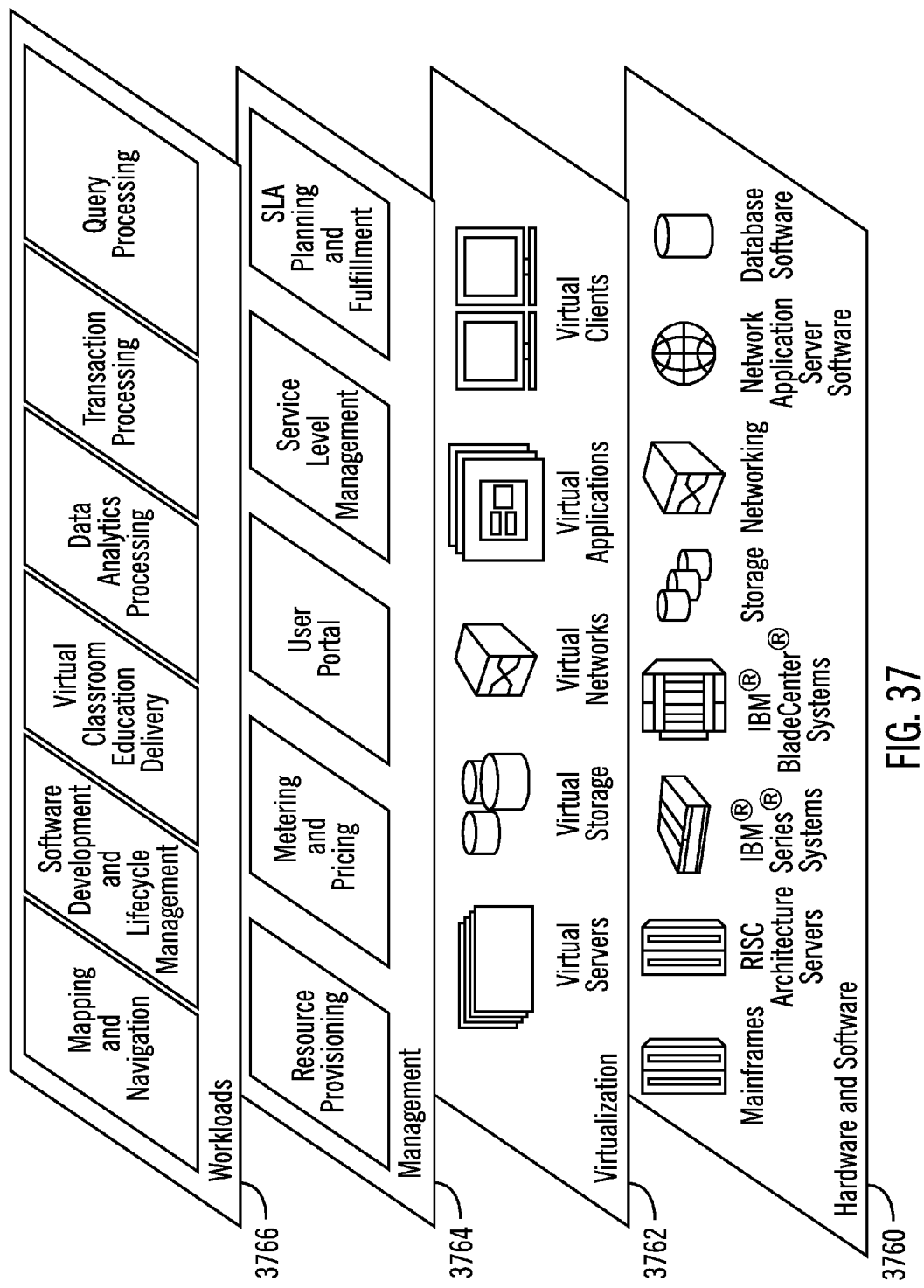
FIG. 37 depicts abstraction model layers in accordance with certain embodiments.

Referring now to FIG. 37, a set of functional abstraction layers provided by cloud computing environment 3650 (FIG. 36) is shown. It should be understood in advance that the components, layers, and functions shown in FIG. 37 are intended to be illustrative only and embodiments of the invention are not limited thereto. As depicted, the following layers and corresponding functions are provided:

Hardware and software layer 3760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 3762 provides an abstraction layer from which the following examples of virtual entities may be provided: virtual servers; virtual storage; virtual networks, including virtual private networks; virtual applications and operating systems; and virtual clients.

In one example, management layer 3764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 3766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and query processing.

Thus, in certain embodiments, software or a program, implementing query processing in accordance with embodiments described herein, is provided as a service in a cloud environment.

In certain embodiments, the computing device 100 has the architecture of computing node 3510. In certain embodiments, the computing device 100 is part of a cloud environment. In certain alternative embodiments, the computing device 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
   generating an On-Line Analytical Processing (OLAP) query having a first expression for retrieving report data and other report data from an OLAP cache and a second expression for retrieving additional report data from the OLAP cache;
   executing the first expression to retrieve the report data that is stored in the OLAP cache to respond to the first expression;
   for the other report data that is not stored in the OLAP cache to respond to the first expression,
      identifying the other report data to be retrieved for the first expression and the additional report data to be retrieved for the second expression that is not stored in the OLAP cache by:
         identifying OLAP objects referenced in the first expression and the second expression;
         mapping the OLAP objects to relational database tables in a relational database using a mapping stored in an OLAP database; and
         grouping OLAP objects from the first expression and the second expression that are mapped to a same relational database table from the relational database tables;
      generating a relational query to retrieve the other report data to be used to respond to the first expression and the additional report data to be used to respond to the second expression from the relational database;
      executing the relational query to retrieve the other report data and the additional report data from the relational database;
      storing the other report data in the OLAP cache;
      using the other report data stored in the OLAP cache to respond to the first expression; and
      pre-loading the additional report data in the OLAP cache in anticipation of execution of the second expression; and
   subsequently executing the second expression by retrieving the additional report data to be used to respond to the second expression from the OLAP cache instead of from the relational database.

2. The method of claim 1, wherein a model includes an OLAP model definition that defines the OLAP model, a relational model definition that defines the relational model, and the mapping between the OLAP model and the relational model.

3. The method of claim 1, wherein the second expression is executed without accessing the relational database.

4. The method of claim 1, wherein the report data is used to respond to another OLAP query.

5. The method of claim 1, further comprising:
   using the report data to generate a report having a layout defined by a layout definition of a report specification.

6. The method of claim 1, wherein a Software as a Service (SaaS) is provided to perform the method.

7. A computer program product, the computer program product comprising:
   a non-transitory computer readable storage medium having computer readable program code embodied therewith, wherein, the computer readable program code, when executed by at least one processor of a computer, is configured to perform:
   generating an On-Line Analytical Processing (OLAP) query having a first expression for retrieving report data and other report data from an OLAP cache and a second expression for retrieving additional report data from the OLAP cache;

executing the first expression to retrieve the report data that is stored in the OLAP cache to respond to the first expression;

for the other report data that is not stored in the OLAP cache to respond to the first expression, identifying the other report data to be retrieved for the first expression and the additional report data to be retrieved for the second expression that is not stored in the OLAP cache by:

identifying OLAP objects referenced in the first expression and the second expression;

mapping the OLAP objects to relational database tables in a relational database using a mapping stored in an OLAP database; and grouping OLAP objects from the first expression and the second expression that are mapped to a same relational database table from the relational database tables;

generating a relational query to retrieve the other report data to be used to respond to the first expression and the additional report data to be used to respond to the second expression from the relational database;

executing the relational query to retrieve the other report data and the additional report data from the relational database;

storing the other report data in the OLAP cache;

using the other report data stored in the OLAP cache to respond to the first expression; and pre-loading the additional report data in the OLAP cache in anticipation of execution of the second expression; and subsequently executing the second expression by retrieving the additional report data to be used to respond to the second expression from the OLAP cache instead of from the relational database.

8. The computer program product of claim 7, wherein a model includes an OLAP model definition that defines the OLAP model, a relational model definition that defines the relational model, and the mapping between the OLAP model and the relational model.

9. The computer program product of claim 7, wherein the second expression is executed without accessing the relational database.

10. The computer program product of claim 7, wherein the report data is used to respond to another OLAP query.

11. The computer program product of claim 7, wherein, the computer readable program code, when executed by the at least one processor of the computer, is configured to perform:

using the report data to generate a report having a layout defined by a layout definition of a report specification.

12. The computer program product of claim 7, wherein a Software as a Service (SaaS) is configured to perform the computer program product operations.

13. A computer system for augmenting a relational query, comprising:

a processor; and a storage device connected to the processor, wherein the storage device has stored thereon a program, and wherein the processor is configured to execute instructions of the program to perform operations, wherein the operations comprise:

generating an On-Line Analytical Processing (OLAP) query having a first expression for retrieving report data and other report data from an OLAP cache and a second expression for retrieving additional report data from the OLAP cache;

executing the first expression to retrieve the report data that is stored in the OLAP cache to respond to the first expression;

for the other report data that is not stored in the OLAP cache to respond to the first expression, identifying the other report data to be retrieved for the first expression and the additional report data to be retrieved for the second expression that is not stored in the OLAP cache by:

identifying OLAP objects referenced in the first expression and the second expression;

mapping the OLAP objects to relational database tables in a relational database using a mapping stored in an OLAP database; and grouping OLAP objects from the first expression and the second expression that are mapped to a same relational database table from the relational database tables;

generating a relational query to retrieve the other report data to be used to respond to the first expression and the additional report data to be used to respond to the second expression;

executing the relational query to retrieve the other report data and the additional report data from the relational database;

storing the other report data in the OLAP cache;

using the other report data stored in the OLAP cache to respond to the first expression; and pre-loading the additional report data in the OLAP cache in anticipation of execution of the second expression; and subsequently executing the second expression by retrieving the additional report data to be used to respond to the second expression from the OLAP cache instead of from the relational database.

14. The computer system of claim 13, wherein a model includes an OLAP model definition that defines the OLAP model, a relational model definition that defines the relational model, and the mapping between the OLAP model and the relational model.

15. The computer system of claim 13, wherein the second expression is executed without accessing the relational database.

16. The computer system of claim 13, wherein the report data is used to respond to another OLAP query.

17. The computer system of claim 13, wherein the operations further comprise:

using the report data to generate a report having a layout defined by a layout definition of a report specification.

18. The computer system of claim 13, wherein a Software as a Service (SaaS) is provided to perform the system operations.

* * * * *